US006763744B2

(12) United States Patent
Johnson et al.

(10) Patent No.: US 6,763,744 B2
(45) **Date of Patent: *Jul. 20, 2004**

(54) TOOL HANDLE FOR HOLDING MULTIPLE TOOLS OF DIFFERENT SIZES DURING USE

(75) Inventors: Kenneth R. Johnson, Campbell, CA (US); Robert L. Johnson, Cupertino, CA (US); Ronald L. Johnson, San Jose, CA (US)

(73) Assignee: Allen-Pal LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,713

(22) Filed: Oct. 16, 2002

(65) Prior Publication Data

US 2003/0075025 A1 Apr. 24, 2003

Related U.S. Application Data

(63) Continuation of application No. 09/898,399, filed on Jul. 3, 2001, now Pat. No. 6,490,954, which is a continuation of application No. 09/330,276, filed on Jun. 11, 1999, now Pat. No. 6,311,587, which is a continuation-in-part of application No. 08/779,336, filed on Jan. 6, 1997, now Pat. No. 5,911,799, which is a continuation of application No. 08/473,758, filed on Jun. 7, 1995, now abandoned, which is a continuation-in-part of application No. 08/282,828, filed on Jul. 29, 1994, now Pat. No. 5,592,859.

(51) Int. Cl.[7] .................................................. B65G 1/08

(52) U.S. Cl. ........................ 81/177.4; 81/177.2; 81/490

(58) Field of Search ............................ 81/177.4, 177.2, 81/439, DIG. 5, 177.5, 177.1; 206/372, 375, 376, 377

(56) References Cited

U.S. PATENT DOCUMENTS 647,528 A 4/1900 Schmidt 1,172,656 A 2/1916 Yorgensen (List continued on next page.)

FOREIGN PATENT DOCUMENTS

| | | |
|---|---|---|
| CA | 1 147 176 | 5/1983 |
| DE | 24 53 480 | 5/1976 |
| DE | 37 44176 A1 | 8/1989 |

(List continued on next page.)

*Primary Examiner*—Lee D. Wilson
(74) *Attorney, Agent, or Firm*—Haverstock & Owens LLP

(57) ABSTRACT

A generally cylindrical shaped tool handle holds multiple sizes of tools. The handle includes one or more holding slots each positioned on one of multiple outer surface faces into which tools are inserted and held. Each holding slot includes one or more contoured compartments in which tools rest when engaged with the handle. Each contoured compartment is of a size and dimension which corresponds to one or more tool sizes. In the preferred embodiment of the tool handle, three of its outer surface faces have a continuous holding slot with multiple receiving holes for inserting therein hexagonal wrenches of multiple sizes. The continuous holding slots of the preferred embodiment of the handle include multiple contoured compartments for holding an inserted hexagonal wrench. Each contoured compartment is formed about a corresponding receiving hole. A lock is positioned over the contoured compartment to irremovably confine the short leg of the hexagonal wrench within the contoured compartment. Hexagonal shaped tools other than wrenches may be used with the handle of the present invention such as screwdrivers and socket wrenches. A tool holder of the present invention is designed to slide over the handle and to hold multiple sizes of tools which may be used with the handle. The tool holder includes a tool holding member having a plurality of cavities for inserting therein appropriately sized tools and a tool handle holding member having a cavity with an inner hollow shape corresponding to a shape of the handle.

28 Claims, 31 Drawing Sheets

U.S. PATENT DOCUMENTS

| | | | | |
|---|---|---|---|---|
| 1,337,769 | A | | 4/1920 | Hemming |
| 1,398,583 | A | | 11/1921 | Bovee |
| 1,500,852 | A | | 7/1924 | Shephard |
| 2,332,656 | A | | 10/1943 | Mirando |
| 2,346,364 | A | | 4/1944 | Dowe |
| 2,409,613 | A | | 10/1946 | Brooks |
| 2,465,619 | A | | 3/1949 | Veit |
| D156,677 | S | | 12/1949 | Smith |
| D157,154 | S | | 2/1950 | Horton |
| 2,512,967 | A | | 6/1950 | Quirion |
| 2,530,024 | A | | 11/1950 | Moody |
| 2,532,636 | A | | 12/1950 | Minnich |
| 2,569,069 | A | | 9/1951 | Motel |
| 2,593,828 | A | | 4/1952 | Arey |
| 2,715,028 | A | | 8/1955 | Dossie |
| 2,719,042 | A | | 9/1955 | Espy |
| 2,804,970 | A | | 9/1957 | Kuc et al. |
| 3,061,927 | A | | 11/1962 | Von Frankenberg Und Ludwigsdorf |
| 3,113,479 | A | | 12/1963 | Swingle |
| 3,257,991 | A | | 6/1966 | Mosch |
| D205,745 | S | | 9/1966 | Nannfeldt |
| 3,592,086 | A | | 7/1971 | Derwin |
| 3,802,286 | A | | 4/1974 | Winklhofer et al. |
| 3,943,801 | A | | 3/1976 | Yates |
| 4,043,230 | A | | 8/1977 | Scrivens |
| 4,154,125 | A | | 5/1979 | Frank |
| 4,227,430 | A | | 10/1980 | Jansson et al. |
| 4,302,990 | A | | 12/1981 | Chrichton et al. |
| 4,384,499 | A | | 5/1983 | Shockley |
| 4,424,728 | A | | 1/1984 | MacDonald |
| 4,716,795 | A | | 1/1988 | Corona et al. |
| 4,716,796 | A | | 1/1988 | Corona et al. |
| 4,820,090 | A | | 4/1989 | Chen |
| 4,882,841 | A | | 11/1989 | Margolis |
| 4,926,721 | A | | 5/1990 | Hsiao |
| 4,934,223 | A | | 6/1990 | Wong |
| 4,979,407 | A | | 12/1990 | Hernandez et al. |
| 5,029,707 | A | | 7/1991 | Feng |
| 5,062,173 | A | | 11/1991 | Collins et al. |
| 5,146,815 | A | | 9/1992 | Scott, III |
| D333,769 | S | | 3/1993 | Jureckson |
| D334,516 | S | | 4/1993 | Tsunoda |
| D339,048 | S | | 9/1993 | Baum |
| 5,263,389 | A | | 11/1993 | Frazell et al. |
| 5,265,504 | A | | 11/1993 | Fruhm |
| D342,433 | S | | 12/1993 | Sorenson |
| 5,271,300 | A | | 12/1993 | Zurbuchen et al. |
| D343,106 | S | | 1/1994 | Eklind et al. |
| 5,320,004 | A | | 6/1994 | Hsiao |
| 5,450,774 | A | | 9/1995 | Chang |
| 5,495,942 | A | | 3/1996 | Izhak |
| 5,499,562 | A | | 3/1996 | Feng |
| 5,517,885 | A | | 5/1996 | Feng |
| 5,522,291 | A | | 6/1996 | Liu |
| 5,535,882 | A | | 7/1996 | Liu |
| D373,943 | S | | 9/1996 | Fuhrmann |
| 5,553,340 | A | | 9/1996 | Brown, Jr. |
| 5,566,596 | A | | 10/1996 | Lin |
| D376,520 | S | | 12/1996 | Morin |
| 5,581,834 | A | | 12/1996 | Collins |
| D377,444 | S | | 1/1997 | Lin |
| 5,592,859 | A | * | 1/1997 | Johnson et al. ............ 81/177.4 |
| D378,797 | S | | 4/1997 | Poremba et al. |
| D382,190 | S | | 8/1997 | Blackston et al. |
| D383,048 | S | | 9/1997 | Sorenson et al. |
| 5,662,013 | A | | 9/1997 | Lin |
| D385,172 | S | | 10/1997 | Bramsiepe et al. |
| 5,711,042 | A | | 1/1998 | Chuang |
| D394,794 | S | | 6/1998 | Vasudeva |
| 5,765,247 | A | | 6/1998 | Seber et al. |
| 5,791,211 | A | | 8/1998 | Bondhus et al. |
| D400,775 | S | | 11/1998 | Hsu |
| D405,335 | S | | 2/1999 | Lin |
| 5,911,799 | A | * | 6/1999 | Johnson et al. ............ 81/177.4 |
| 5,916,277 | A | | 6/1999 | Dallas |
| 5,970,828 | A | | 10/1999 | Bondhus et al. |
| D415,946 | S | | 11/1999 | Tsai |
| 5,992,626 | A | | 11/1999 | Anderson |
| D420,885 | S | | 2/2000 | Lin |
| D426,449 | S | | 6/2000 | Eklind |
| D426,450 | S | | 6/2000 | Eklind |
| D427,875 | S | | 7/2000 | Chiu |
| 6,128,981 | A | | 10/2000 | Bondhus et al. |
| D435,415 | S | | 12/2000 | Johnson et al. |
| D435,773 | S | | 1/2001 | Lin |
| D437,541 | S | | 2/2001 | Hermansen et al. |
| 6,311,587 | B1 | * | 11/2001 | Johnson et al. ............ 81/177.4 |
| D459,967 | S | | 7/2002 | Johnson et al. |
| 6,490,954 | B2 | * | 12/2002 | Johnson et al. ............ 81/177.4 |

FOREIGN PATENT DOCUMENTS

| | | |
|---|---|---|
| EP | 856223 | 12/1960 |
| EP | 0 503 559 A1 | 9/1992 |
| EP | 0 618 046 A1 | 10/1994 |
| FR | 787512 | 9/1935 |
| WO | WO 83/01406 | 4/1983 |
| WO | WO 97/29887 | 8/1997 |

* cited by examiner

TOOL HANDLE FOR HOLDING MULTIPLE TOOLS OF DIFFERENT SIZES DURING USE

RELATED APPLICATIONS

This Patent Application is a continuation of U.S. patent application Ser. No. 09/898,399, filed on Jul. 3, 2001 is now U.S. Pat. No. 6,490,954, which is a continuation of U.S. patent application Ser. No. 09/330,276, filed on Jun. 11, 1999, issued as U.S. Pat. No. 6,311,587, which is a continuation-in-part of U.S. patent application Ser. No. 08/779,336, filed on Jan. 06, 1997, issued as U.S. Pat. No. 5,911,799, which is a continuation of U.S. application Ser. No. 08/473,758, filed on Jun. 07, 1995, now abandoned, which is a continuation-in-part of U.S. patent application Ser. No. 08/282,828, filed on Jul. 29, 1994, issued as U.S. Pat. No. 5,592,859.

FIELD OF THE INVENTION

The present invention relates to the field of hand held tools. More specifically, the present invention relates to the field of hexagonal wrenches and related safety, comfort, and convenience accessories and tools.

BACKGROUND OF THE INVENTION

Hexagonal wrenches or tool drivers, also referred to as allen wrenches or L-wrenches, have a hexagonal L-shaped body, including a long leg member and a short leg member. The end of either leg member may be inserted into a head of a screw or tool designed to accept a hexagonal wrench. Once inserted, rotational pressure is applied to the hexagonal wrench in order to tighten or loosen the screw. The leg members of the hexagonal wrench are designed to be of different lengths in order to allow a user flexibility when using the wrench in different environments and situations. For example, in a narrow, confined environment, the long leg of the hexagonal wrench is inserted into the head of the screw and the user will apply rotational pressure to the short leg. Or, if the environment is not so confined, the user may insert the short leg of the hexagonal wrench into the head of the screw and apply rotational pressure to the long leg.

Hexagonal wrenches are manufactured and distributed in multiple English and metric sizes in order to facilitate their use with screw heads of multiple sizes. Such wrenches are usually sold in a set which includes wrenches of multiple sizes but are also distributed individually.

When using a hexagonal wrench, a user, will insert an end of the hexagonal wrench into the head of a workpiece such as a screw, and will then exert rotational pressure on the opposite end of the wrench in order to tighten or loosen the screw. Because of the size and dimensions of the hexagonal wrench it is particularly difficult to exert a great amount of rotational pressure on the hexagonal wrench when the long leg of the hexagonal wrench is inserted into the head of the screw. Because the hexagonal wrench is typically turned with the user's fingers, the user may also experience scrapes and cuts from the use of hexagonal wrenches in this manner. Ingenuitive users have also used other tools, including vice grips, pliers and the like, to turn hexagonal wrenches. However, this method is disadvantageous because such tools may lose their hold on the hexagonal wrench when rotational pressure is applied or may even bend or otherwise disfigure the hexagonal wrench.

What is needed is an apparatus which will accept multiple sized hexagonal wrenches and which will further enhance a user's ability to exert rotational pressure on a hexagonal wrench without subjecting the user to personal injury or requiring the use of additional tools which may bend or disfigure the hexagonal wrench.

What is further needed is a tool holder which will hold and store multiple sized hexagonal wrenches and which will hold and store an apparatus for use with the hexagonal wrenches, in a compact and convenient arrangement.

SUMMARY OF THE INVENTION

A generally cylindrical shaped tool handle holds multiple sizes of tools, one tool at a time. The preferred embodiment of the tool handle of the present invention is hexagonal shaped and capable of holding multiple sizes of hexagonal tools. The tool handle includes one or more holding slots, each positioned on one of multiple outer surface faces into which tools are inserted and held. Each holding slot includes one or more contoured compartments in which tools rest when engaged with the tool handle. Each contoured compartment is of a size and dimension which corresponds to one or more tool sizes.

In the preferred embodiment of the handle, three of its outer surface faces have a continuous holding slot with multiple receiving holes for inserting therein hexagonal wrenches of multiple sizes. The continuous holding slots of the preferred embodiment of the handle include multiple contoured compartments for holding an inserted hexagonal wrench. Each contoured compartment is formed about a corresponding receiving hole.

In use, a tool such as a hexagonal wrench is positioned in an appropriate holding slot with the short leg or mounting end of the hexagonal wrench resting in the contoured compartment within the appropriate holding slot and the long leg of the hexagonal wrench protruding through an aperture or receiving hole formed through the bottom of the holding slot and penetrating the tool handle. The long leg has a proximal end for driving an appropriate screw or tool such as one with a head including a hexagonal-shaped recess. A lock is then positioned over the contoured compartment to irremovably confine the short leg of the hexagonal wrench within the contoured compartment and the appropriate holding slot. The lock has a cavity for coupling the lock to the tool handle by inserting the tool handle through the cavity. Preferably, the lock is selectively positionable along the length of the tool handle. The lock may be positioned to hold a tool in any one of the contoured compartments within any one of the holding slots. A user's movement of the lock is enhanced by external ridges on the lock.

The tool handle of the preferred embodiment includes a first surface barrier and a second surface barrier, each positioned at opposite ends of the tool handle, for maintaining the lock along the length of the tool handle, thus avoiding separation of the lock from the tool handle. Hexagonal shaped tools other than wrenches may also be used with the tool handle of the present invention such as screwdrivers and socket wrenches.

A tool holder of the present invention is designed to slide over the tool handle of the present invention and to hold multiple sizes of tools, such as hexagonal wrenches, which may be used with the tool handle. The tool holder preferably includes a standard tool portion and a metric tool portion. Each of the tool portions of the tool holder includes a tool holding member and a tool handle holding member. The tool holding member has a plurality of cavities for inserting therein appropriately sized tools. The tool handle holding member has a cavity with an inner hollow shape corresponding to a shape of the tool handle for inserting therein the tool handle.

DETAILED DESCRIPTION OF THE PREFERRED EMBODIMENT

Figure 1:
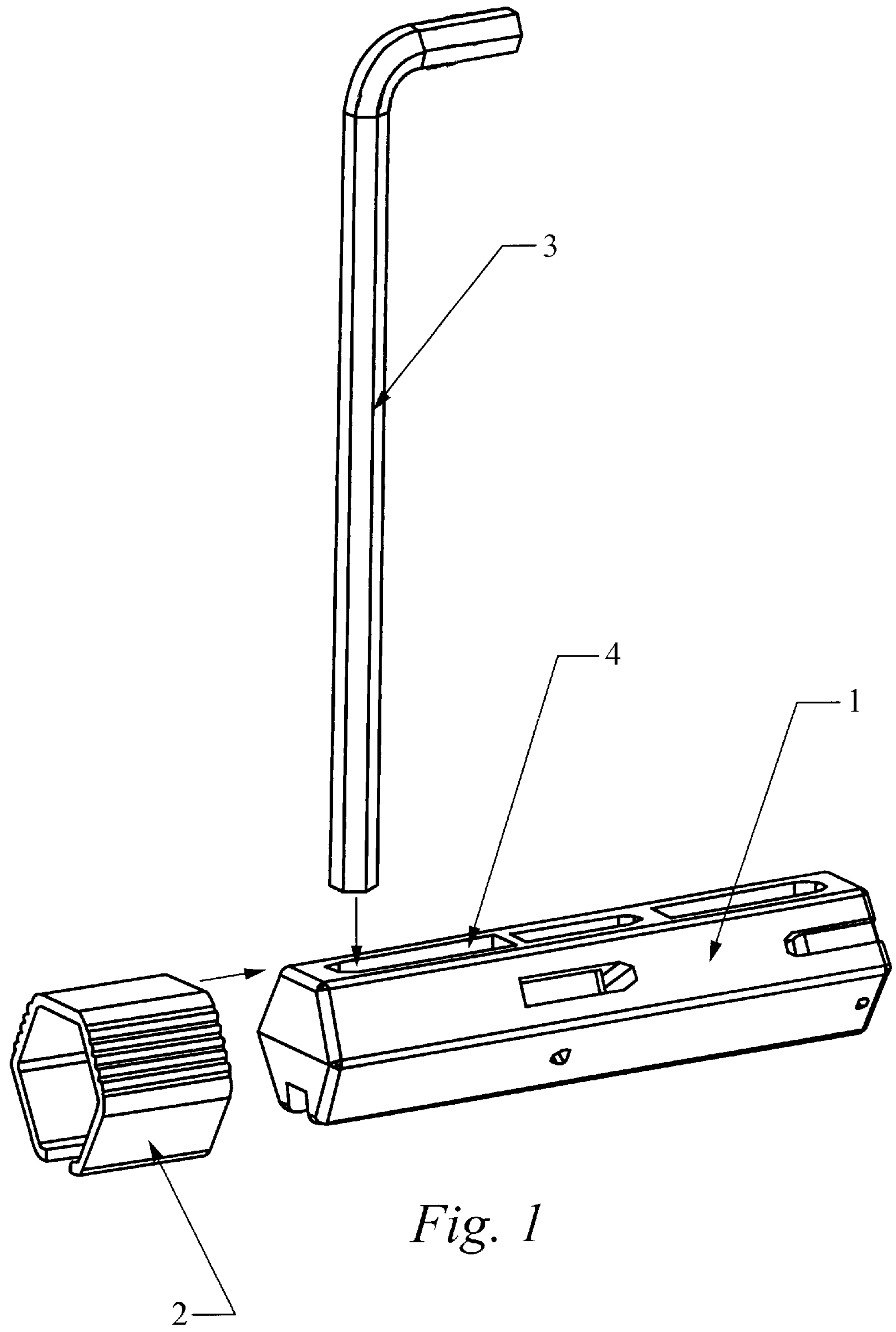
FIG. 1 illustrates a perspective view of a first embodiment of the present invention showing the relationship of both a hexagonal wrench and a lock to a tool handle.

A perspective view of the hexagonal wrench handle 1 of a first embodiment of the present invention is illustrated in FIG. 1. Multiple sizes of hexagonal wrenches 3 may be inserted into and held by the handle 1 in an appropriate sized holding slot 4. When inserted into the handle 1, a hexagonal wrench 3 is positioned in the appropriately sized holding slot 4 with the short leg or mounting end of the hexagonal wrench 3 resting in the holding slot 4 and the long leg of the hexagonal wrench extending through an aperture formed through a bottom of the holding slot 4 and penetrating the handle 1. The hexagonal wrench 3 includes an elongated rod having a bend through a predetermined angle. A proximal end of the hexagonal wrench 3 is for engaging a tool or screw which is driven by the hexagonal wrench 3. The short leg member or mounting end of the hexagonal wrench 3 extends from the bend to a distal end.

Once a hexagonal wrench 3 is inserted into the handle 1 and rests in an appropriately sized holding slot 4, the lock 2 is slid along the handle 1 and positioned over the holding slot 4 and the short leg of the hexagonal wrench 3, thereby locking the hexagonal wrench 3 within the holding slot 4.

Figure 2:
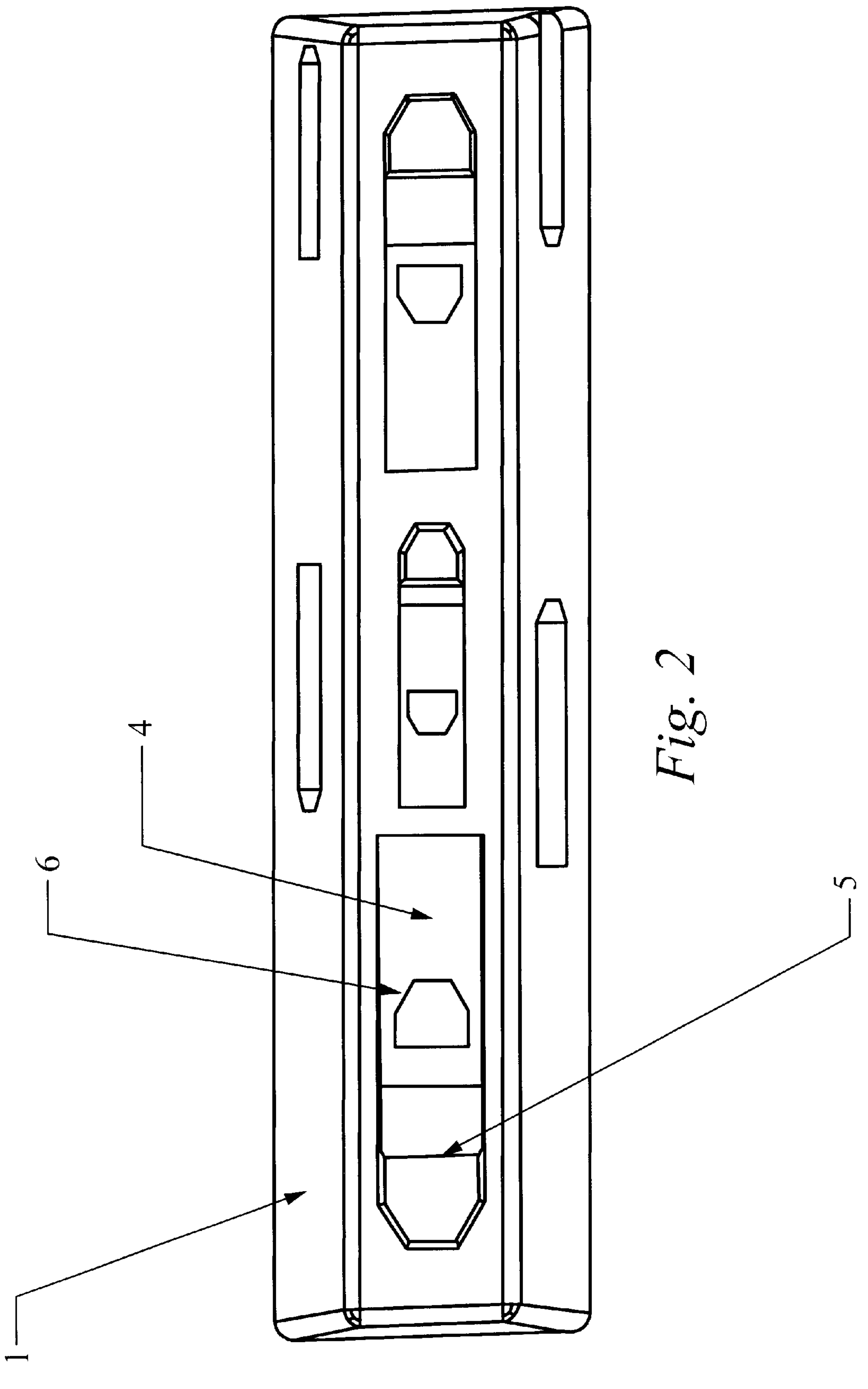
FIG. 2 illustrates a top view of a tool handle according to a first embodiment of the of the present invention.

FIG. 2 illustrates a top view of the handle 1. When the wrench 3 is positioned within the appropriate sized holding slot 4, the long leg of the hexagonal wrench 3 extends through a corresponding receiving hole 5 in the handle 1. The holding slot 4 and the receiving hole 5 are of a size to accept the corresponding hexagonal wrench 3 and hold it firmly so that it will not rotate or twist in the holding slot 4 during use. The receiving hole 5 extends through the fill width of the handle 1. In order to maximize the flexibility of the handle 1 of the embodiment illustrated in FIG. 2, a receiving hole for a first sized hexagonal wrench may extend through a holding slot for a second sized hexagonal wrench on a diametrically opposing side of the handle 1. For example, the receiving hole 6 extends from a holding slot positioned on the bottom of the handle 1, with the top of the handle illustrated in FIG. 2. Because the receiving hole 6 extends through the full width of the handle 1, it has an opening in the holding slot 4. When a hexagonal wrench is held by the handle 1 and positioned in the holding slot on the bottom of the handle 1, the long leg of the hexagonal wrench will extend through the receiving hole 6 and also through the holding slot 4.

The handle 1 has a generally cylindrical shape having two ends and a generally cylindrical surface. The handle 1 of the first embodiment of the present invention is designed to have a hexagonal shape with six outer surface faces. Each face may include one or more holding slots 4 and one or more receiving holes 5. Each face has a corresponding diametrically opposed face on an opposite side of the handle, such that each receiving hole 5 extends through the handle 1 from the face which includes the corresponding holding slot 4 to the corresponding diametrically opposed face. As will be apparent to a person skilled in the art the handle 1 of the present invention may include more or less than six outer surface faces.

Figure 3:
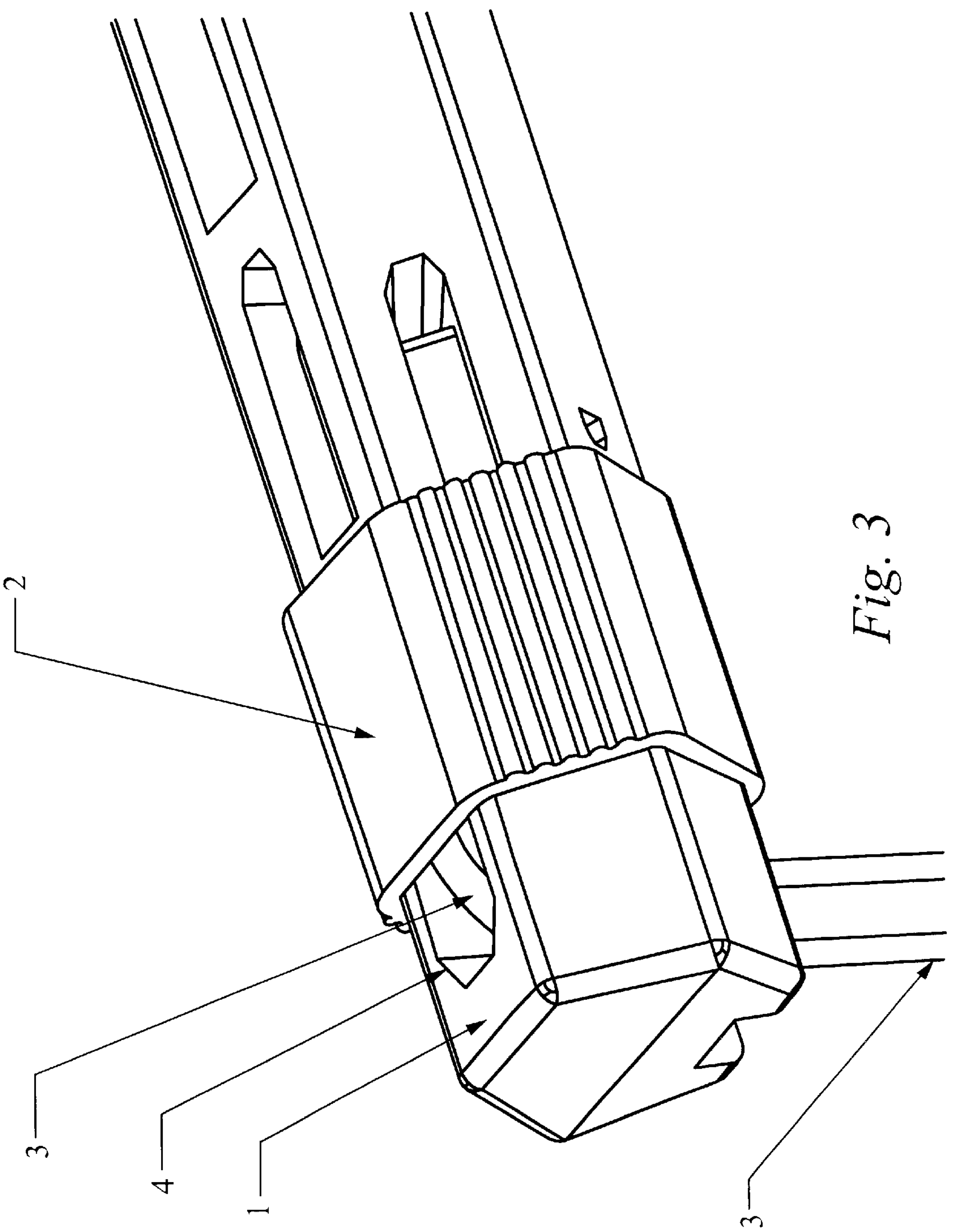
FIG. 3 illustrates a hexagonal wrench locked into a tool handle according to a first embodiment of the present invention.
Figure 4:
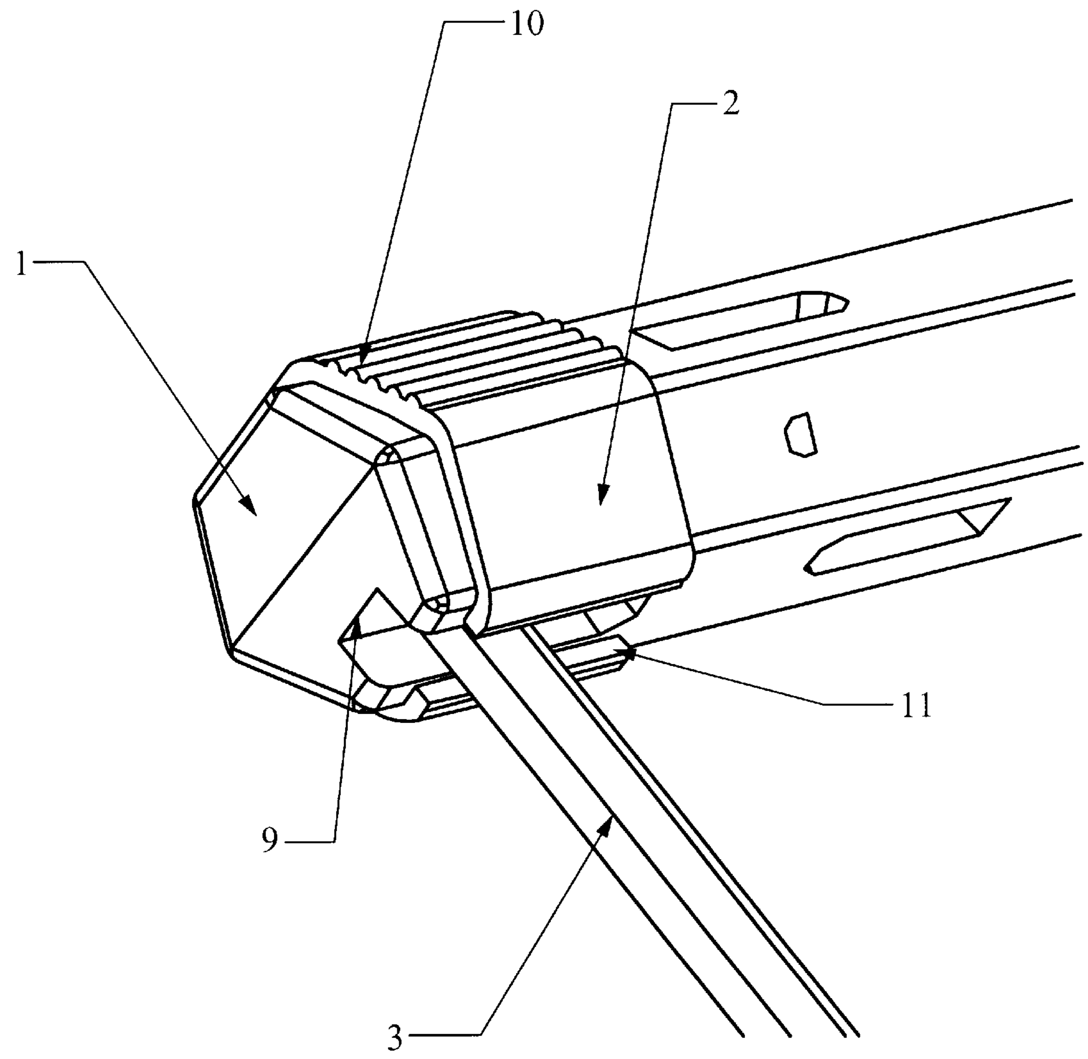
FIG. 4 illustrates an inserted wrench protruding through the bottom of a tool handle and the separation of a lock according to a first embodiment of the present invention.
Figure 5:
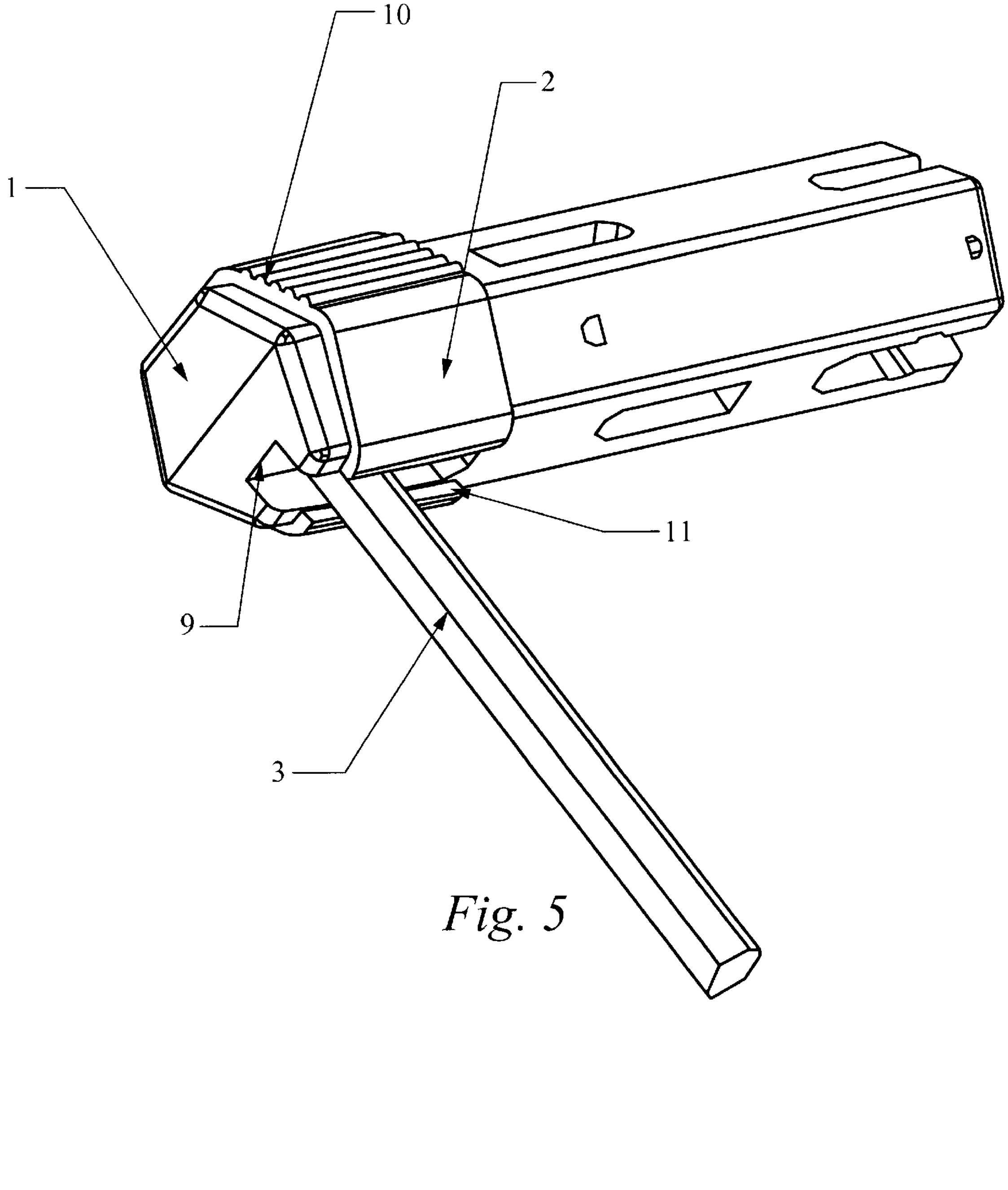
FIG. 5 illustrates a wrench locked into a handle according to a first embodiment of the present invention.

FIGS. 3, 4 and 5 illustrate a hexagonal wrench 3 locked within a holding slot 4 of the handle 1 by the lock 2. The holding slots 4 of the handle are designed to be of a depth which will leave the top of the short leg of the wrench 3 flush with the top of the handle 1 so that when the lock 2 is positioned over the wrench 3 it will tightly hold the short leg of the wrench 3 within the holding slot 4 and will not allow it to rotate or twist during use. The bottom of the lock 2 is designed with a separation 11 which allows the long leg of the wrench 3 to protrude through it.

The lock 2 is designed of a shape to closely correspond to the shape of the handle 1. The bottom of the lock 2 is designed to be slightly smaller than the top of the lock 2 in order to provide a built-in, self-clamping mechanism allowing the lock 2 to tightly bind itself to the outer surface faces of the handle 1. The lock 2 is also designed with the external ridges 10 on each top side face. The external ridges 10 are used by the user to unlock the lock 2 from the handle 1 and move the lock 2 along the handle 1. In order to move the lock 2 along the handle 1, the user pinches the lock 2 at the external ridges 10 which forces the bottom of the lock 2 apart and allows the lock 2 to be slid along the handle 1. When pressure is applied to the lock 2 it will slide along the handle when the external ridges 10 are not pinched. However, pinching the external ridges 10 enhances the movement of the lock 2 along the handle. The lock 2 may be rotated around the handle 1 in order to be positioned over a holding slot 4 on any face of the handle 1. In the first embodiment of the present invention, the top surface of the lock 2 is flat in order to allow information and advertisements to be displayed there.

FIG. 5 illustrates a full view of the handle 1 of the first embodiment of the present invention with a hexagonal wrench 3 locked therein by the lock 2. As illustrated in FIG. 5, the long leg of the hexagonal wrench 3 extends through a holding slot 9 in the bottom of the handle 1 and through the bottom of the lock 2.

Figure 6:
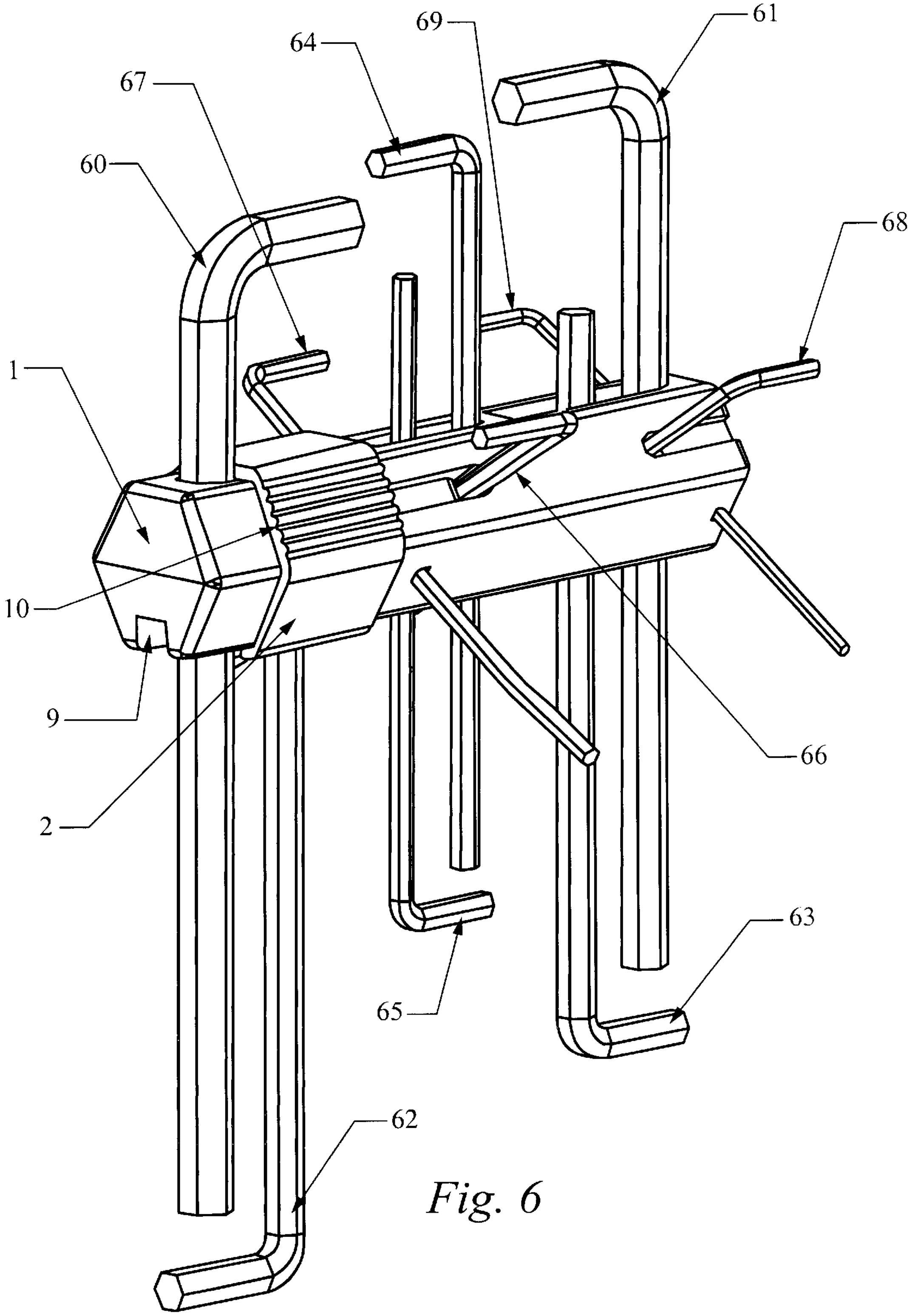
FIG. 6 illustrates the multiple sizes of hexagonal wrenches which may be inserted into a tool handle according to a first embodiment of the present invention.

FIG. 6 illustrates the multiple sizes of hexagonal wrenches which may be used with the handle 1 of the first embodiment of the present invention. As stated above, each holding slot 4 is of a size which corresponds to a size of a conventional hexagonal wrench. In order to enhance the user's ability to exert rotational pressure on the larger hexagonal wrenches, the holding slots 4 which hold the larger wrenches 3 are oriented at the ends of the handle 1 of this embodiment The holding slots 4 corresponding to smaller wrenches 3 are oriented in the middle of the handle 1 and when in use form a "T"-shaped handle. The drawing of FIG. 6 is for illustration purposes only, when in use the handle 1 of the present invention is designed to work with one hexagonal wrench at a time.

The handle 1 of the first embodiment of the present invention illustrated in FIG. 6 is designed to hold hexagonal wrenches of English sizes including a 9/32 inch hexagonal wrench 60, a 1/4 inch hexagonal wrench 61, a 7/32 inch hexagonal wrench 62, a 3/16 inch hexagonal wrench 63, a 5/32 inch hexagonal wrench 64, a 9/64 inch hexagonal wrench 65, a 1/8 inch hexagonal wrench 66, a 7/64 inch hexagonal wrench 67, a 3/32 inch hexagonal wrench 68, and a 5/64 inch hexagonal wrench 69. In an alternate configuration of the first embodiment of the handle 1 of the present invention, designed to hold hexagonal wrenches of metric sizes, the wrench 60 would be a 10 mm hexagonal wrench, the wrench 61 would be an 8 mm hexagonal wrench, the wrench 62 would be a 6 mm hexagonal wrench, the wrench 63 would be a 5 mm hexagonal wrench, the wrench 64 would be a 4.5 mm hexagonal wrench, the wrench 65 would be a 4 mm hexagonal wrench, the wrench 66 would be a 3.5 mm hexagonal wrench, the wrench 67 would be a 3 mm hexagonal wrench, the wrench 68 would be a 2.5 mm hexagonal wrench and the wrench 69 would be a 2 mm hexagonal wrench. Preferably, the size of the wrench 3 which corresponds to the holding slot 4 is molded into, printed on, or engraved into the handle 1 to aid the user in efficiently finding the appropriate holding slot 4 for the necessary wrench 3. It should be apparent to one skilled in the art that a handle 1 according to the first embodiment of the present invention may be formed to hold additional or different sizes of hexagonal wrenches.

The lock 2 of the first embodiment of the present invention may be positioned over any of the holding slots 4 for holding any of the hexagonal wrenches in place during use. The top of the lock 2 is rotated around the handle so that it is directly over the appropriate holding slot 4 and the separation 11 is positioned to allow the long leg member of the hexagonal wrench to extend therethrough.

The handle 1 of the first embodiment of the present invention is designed to be of a hexagonal shape, including six faces. Each face is approximately 1 inch across its width. The handle 1 is approximately 4.5 inches in length. The handle 1 is designed to provide a comfortable, user-friendly interface to a user's hand, in order to enhance a user's ability to exert rotational pressure on the hexagonal wrench 3 without subjecting the user to personal injury or requiring the use of additional tools. As should be apparent to one skilled in the art, the handle 1 of the first embodiment of the present invention may be designed to be of any convenient shape, including any reasonable number of faces.

The handle 1 may be composed of any appropriate material, which is of maximum strength and includes properties which resist materials that the handle will likely be exposed to, e.g., oil, grease, gasoline and the like. Preferably, the handle 1 is materially composed of either xenoy or valox. Alternatively, the handle 1 may be materially composed of any suitable composition including, but not limited to aluminum or steel.

The handle 1 of the first embodiment of the present invention is constructed using an injection molded, core/cavity process as is well known in the art. Alternatively, the handle 1 may be constructed in any known manner.

The lock 2 preferably is materially composed of a styrene-based material but alternatively may also be composed of any appropriate material. The lock 2 is cut from an extrusion, from which multiple locks may be cut, as is well known in the art. As stated above, the lock 2 is constructed so that the bottom of the lock 2 is smaller than the top of the lock in order to give the lock 2 a natural spring-like property which locks it to the handle.

Figure 7A:
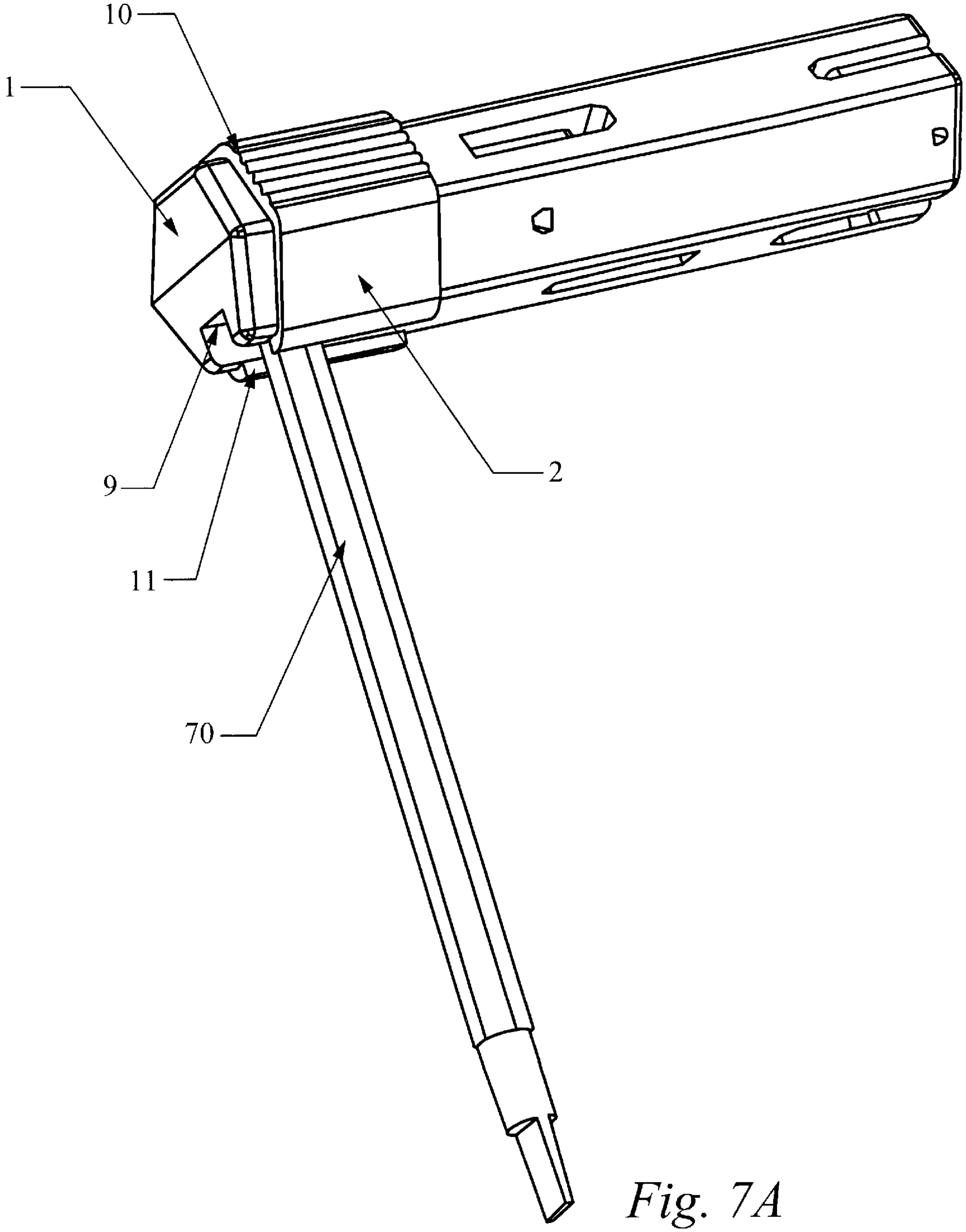
FIG. 7A illustrates the use of a hexagonal flat screwdriver with a tool handle according to a first embodiment of the present invention.
Figure 7B:
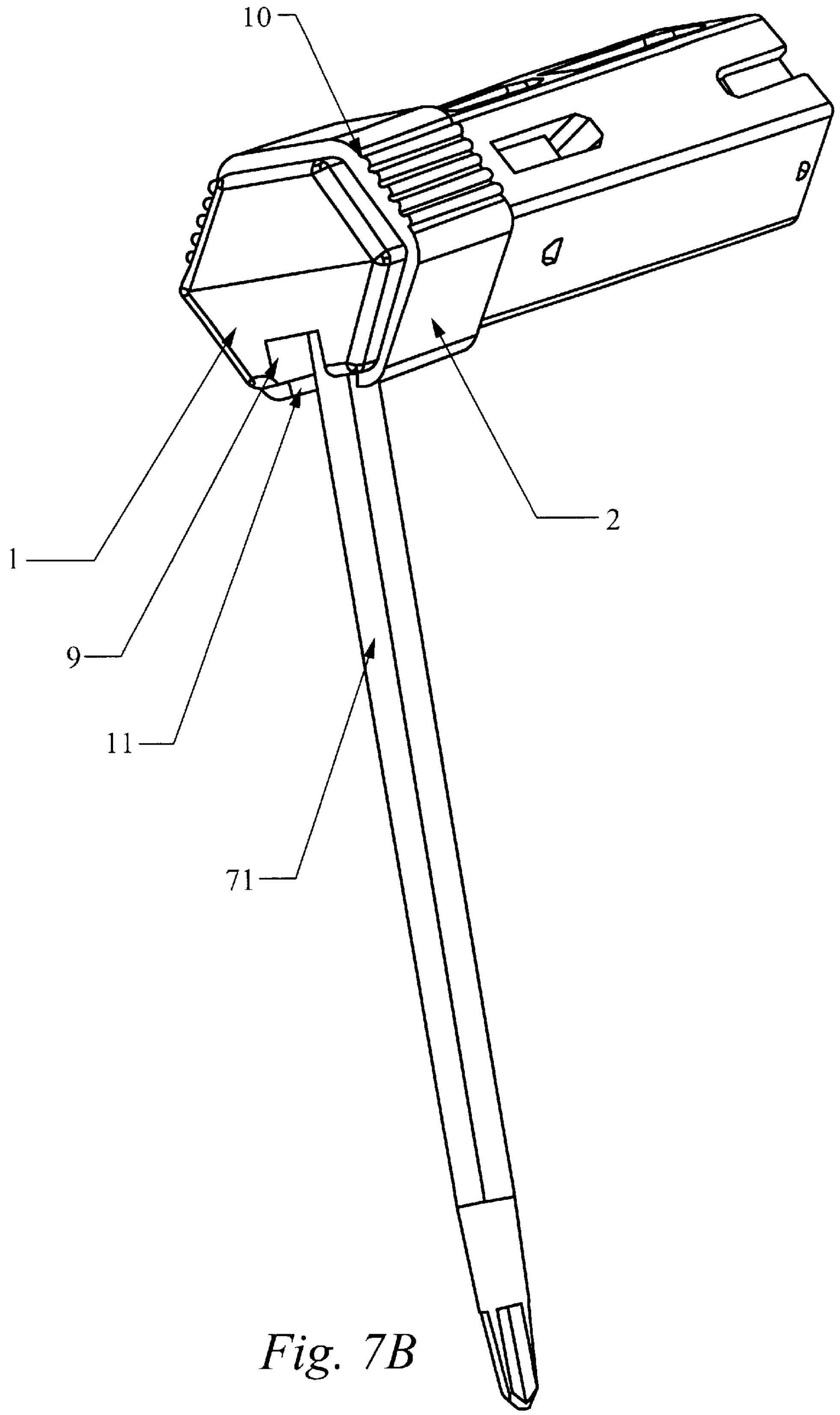
FIG. 7B illustrates the use of a hexagonal phillips screwdriver with a tool handle according to a first embodiment of the present invention.
Figure 7C:
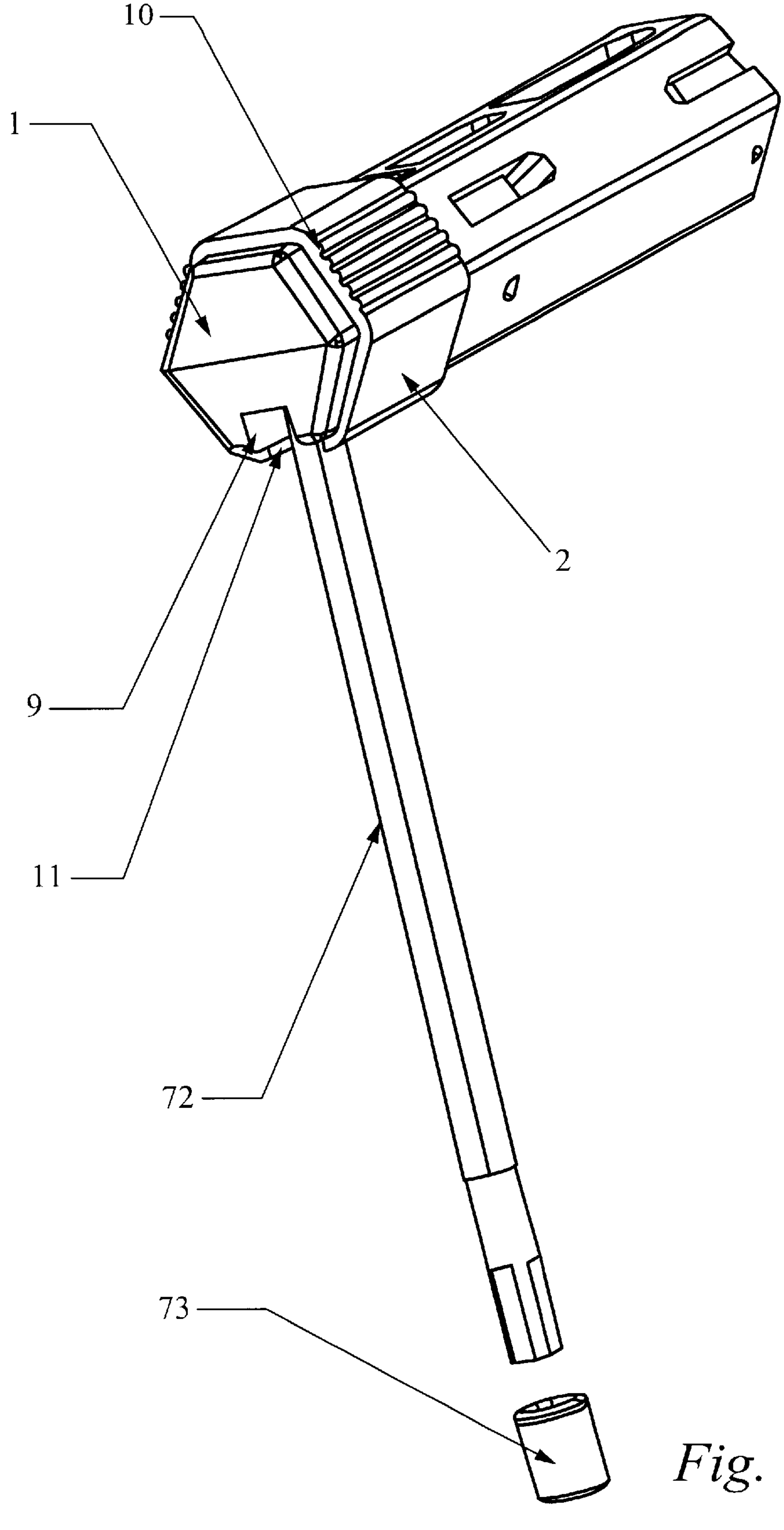
FIG. 7C illustrates the use of a hexagonal socket wrench and corresponding socket with a tool handle according to a first embodiment of the present invention.

As illustrated in FIGS. 7A, 7B and 7C, the handle 1 may be used with tools other than hexagonal wrenches. A flat screwdriver 70 may be used with the handle 1 of the first embodiment of the present invention by including it on the end of a hexagonal L-shaped bar of a size corresponding to one of the holding slots 4, as illustrated in FIG. 7A. A phillips screwdriver 71 may be used with the handle 1 of the first embodiment of the present invention by also including it on the end of a hexagonal L-shaped bar of a size corresponding to one of the holding slots 4, as illustrated in FIG. 7B. A socket wrench 72 may also be used with the handle 1 of the first embodiment of the present invention by including it on the end of a hexagonal L-shaped bar of a size corresponding to one of the holding slots 4, as illustrated in FIG. 7C. When a socket wrench is held by the handle 1, sockets 73 of different sizes may then be coupled to the socket wrench in order to tighten or loosen nuts and bolts of different sizes. Alternatively, any other appropriate tools may be used with the handle 1 of the first embodiment of the present invention. An alternative configuration of the handle 1 of the first embodiment of the present invention holds a screwdriver or socket wrench plugged into an end of the handle 1.

Figure 8:
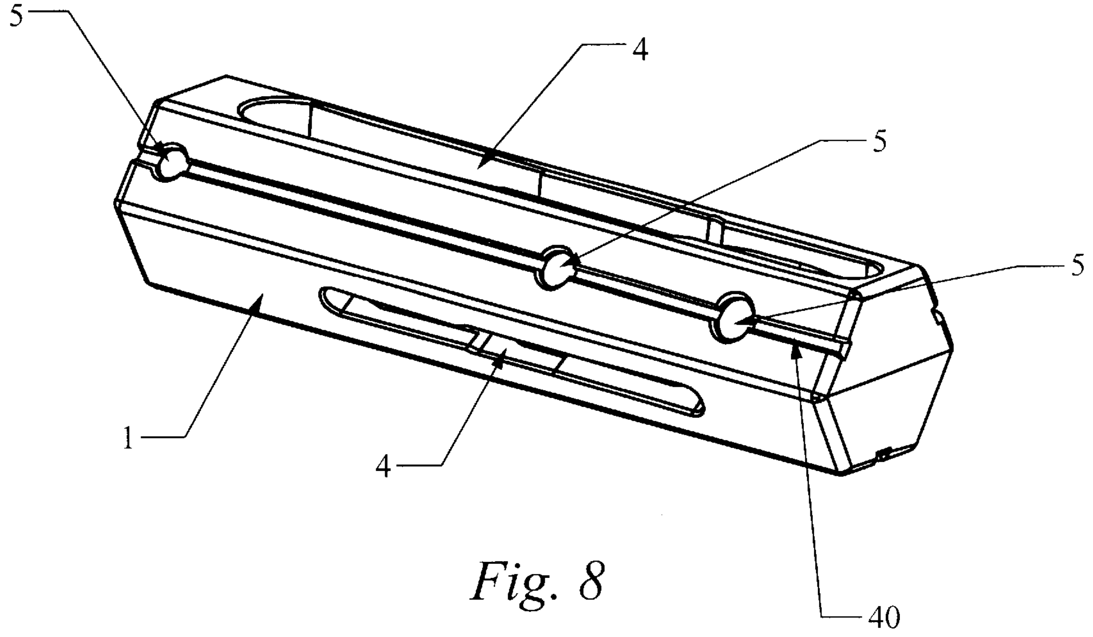
FIG. 8 illustrates a perspective view of a tool handle according to a second embodiment of the present invention.
Figure 9:
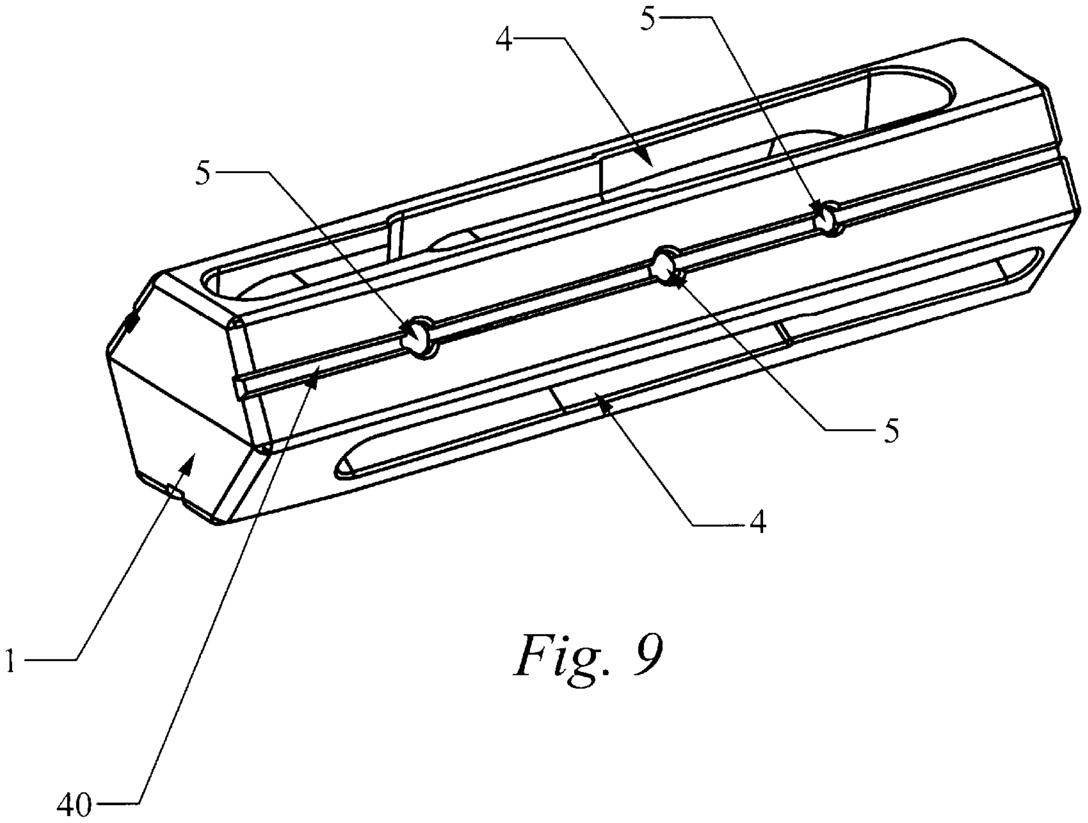
FIG. 9 illustrates a perspective view of a tool handle according to a second embodiment of the present invention, showing the continuous holding slots, the receiving holes and the lock positioning slots.

A second embodiment of the handle 1 according to the present invention is illustrated in FIGS. 8 and 9. In this embodiment, the holding slots 4 are continuous along a face of the handle 1. Not all hexagonal wrenches are uniform in size and dimensions. The hexagonal wrenches manufactured by one manufacturer may have different dimensions than hexagonal wrenches manufactured by another manufacturer. Specifically, the lengths of the short legs of hexagonal wrenches may be different depending on the manufacturer. The continuous holding slots 4 of the second embodiment of the present invention allow for use with hexagonal wrenches having different length short legs. When using a hexagonal wrench with a longer short leg the continuous holding slot 4 will receive and hold the extra length of the short leg. In this manner, hexagonal wrenches of different dimensions from multiple manufacturers may be accommodated by the handle 1 with continuous holding slots 4.

Also, in the handle 1 of the second embodiment of the present invention, the continuous holding slots are positioned on three faces of the hexagonally shaped handle 1 and the corresponding receiving holes 5 are positioned on a diametrically opposed parallel face, without a continuous holding slot 4. It should be apparent to those skilled in the art that the continuous holding slots 4 within the handle 1 of the second embodiment of the present invention may be positioned on any appropriate number of faces of the handle 1. It should also be apparent that the receiving holes 5 will have to be positioned within a continuous holding slot 4, as described above, if holding slots 4 were positioned on more than three faces.

The handle 1 with continuous holding slots 4 also includes positioning slots 40 for engaging the slidable lock 2, as will be described below. In the second embodiment of the present invention, the positioning slots 40 are included on the same faces of the handle 1 as the receiving holes 5.

Figure 10:
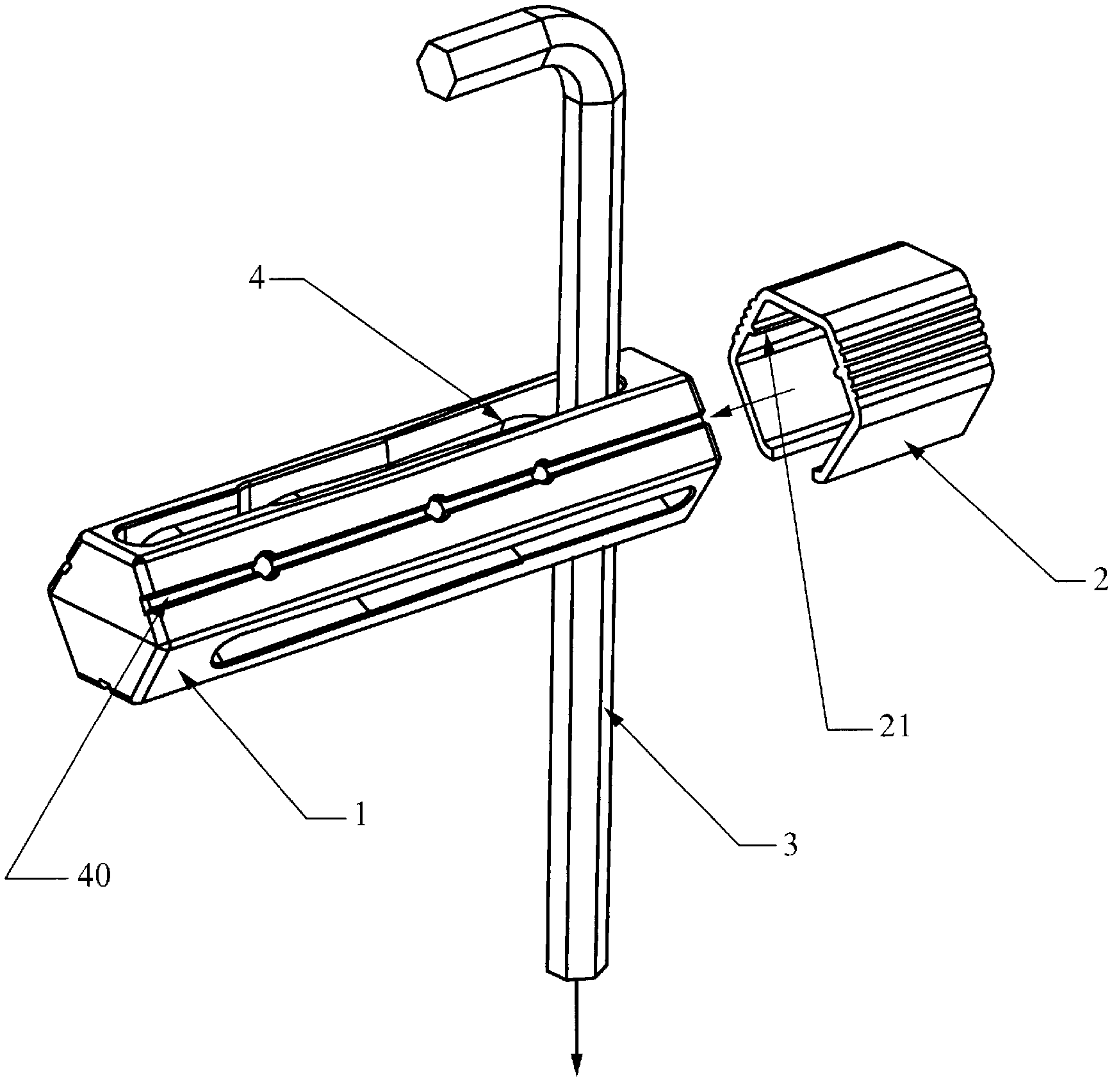
FIG. 10 illustrates a perspective view of a tool handle according to a second embodiment of the present invention with a hexagonal wrench inserted through an appropriate receiving hole and showing a slidable lock positioned relative to the lock positioning slots.
Figure 11:
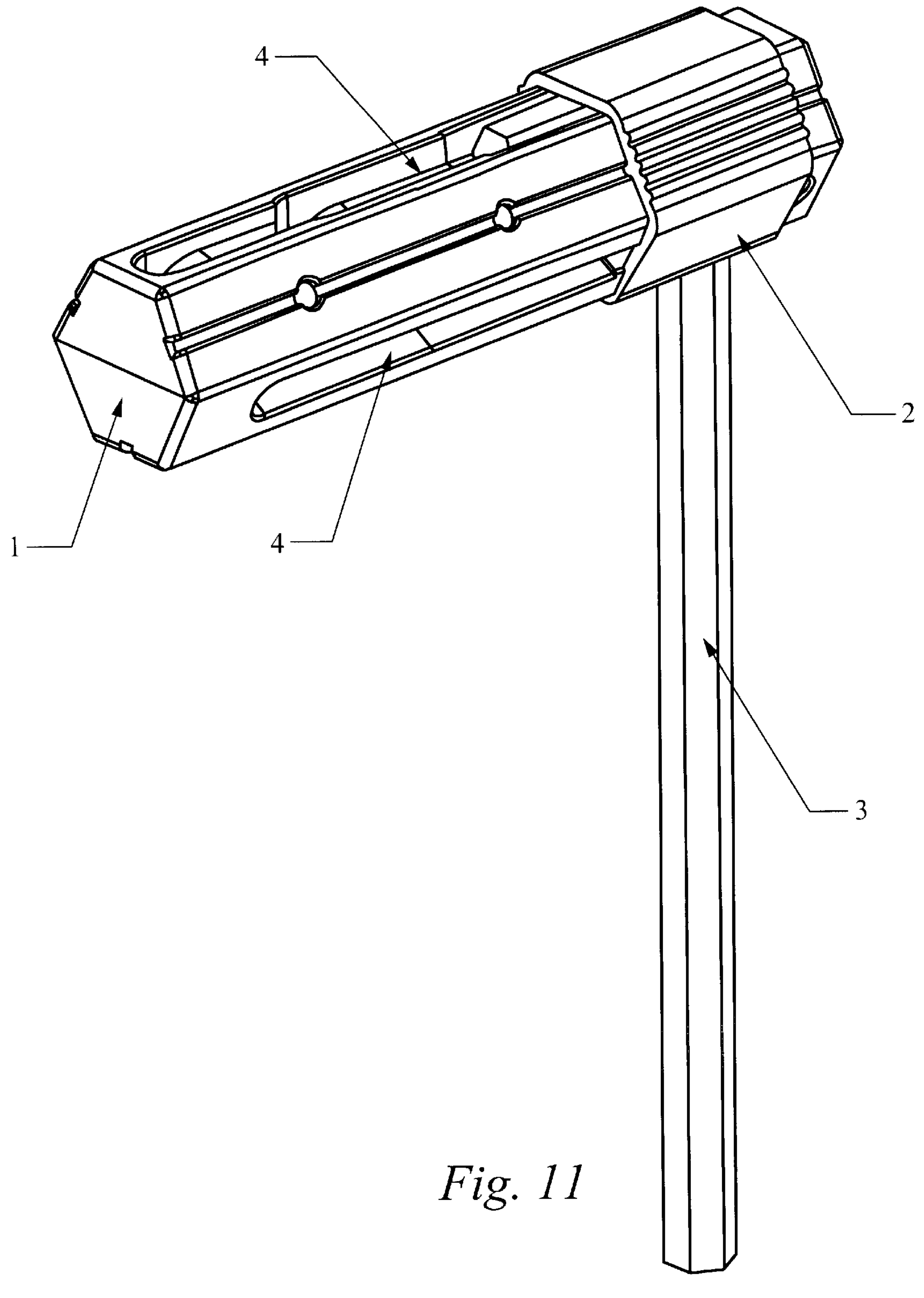
FIG. 11 illustrates a wrench locked into a tool handle according to a second embodiment of the present invention.

The placement of a hexagonal wrench 3 into a continuous holding slot 4 is illustrated in FIG. 10. The long leg of the hexagonal wrench 3 is inserted, as described above, into the appropriately sized receiving hole until the short leg of the hexagonal wrench 3 is seated in the continuous holding slot 4. In this embodiment, the slidable lock 2 includes the inner ridges 21 which are designed to slide within the corresponding positioning slots 40 and prevent the slidable lock 2 from rotating around the handle 1 during use. To engage the slidable lock 2 on the handle 1, the top of the slidable lock is aligned with the face of the handle 1 which includes the continuous holding slot 4 to be covered. The inner ridges 21 are then aligned with the appropriate corresponding positioning slots 40 and the lock 2 is slid onto the handle 1 and positioned over the wrench 3 to be held, as illustrated in FIG. 11.

Figure 12:
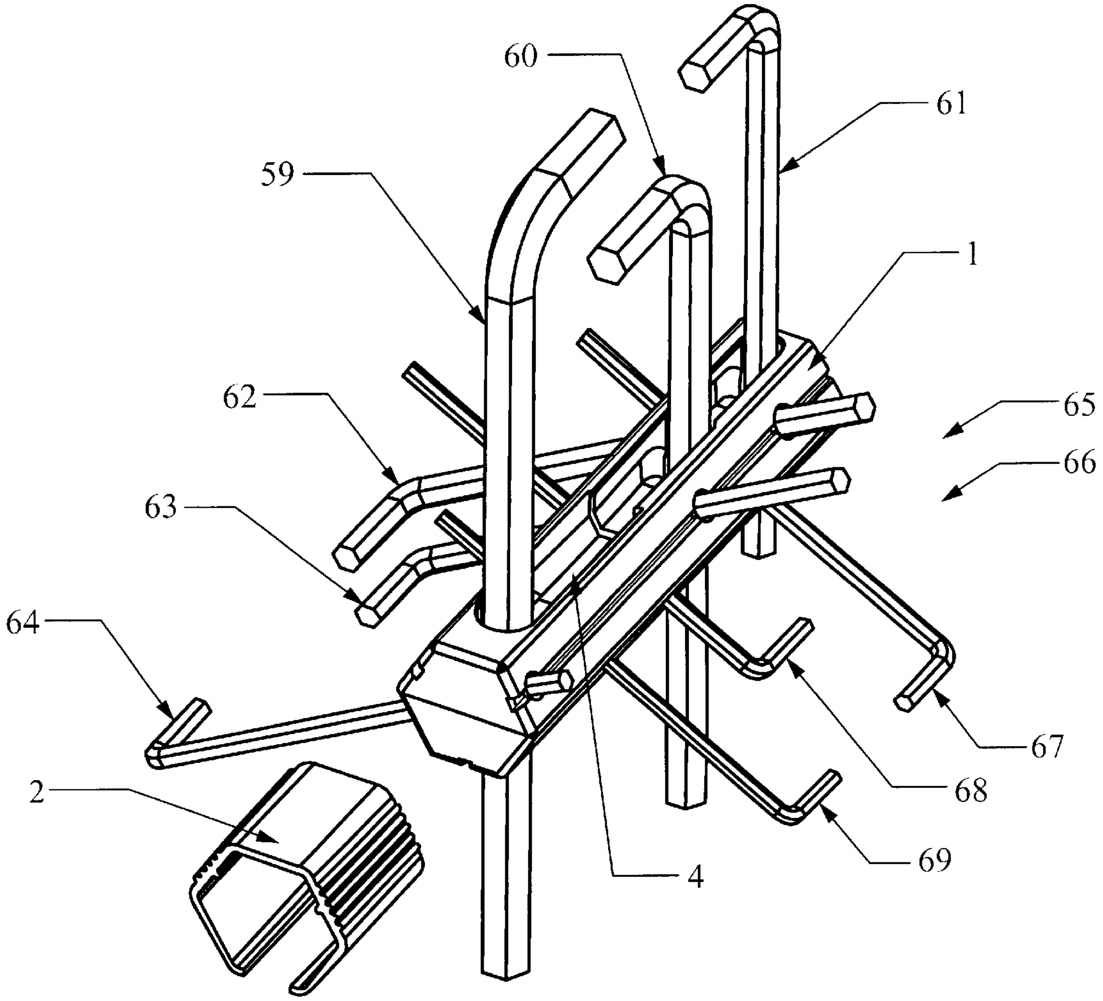
FIG. 12 illustrates the multiple sizes of hexagonal wrenches which may be inserted into a tool handle according to a second embodiment of the present invention.

FIG. 12 illustrates the multiple sizes of hexagonal wrenches which may be used with the handle 1 having continuous holding slots 4. In this embodiment, because of the use of the continuous holding slots 4, each holding slot is designed to accept and hold wrenches of close sizes. For example, the continuous holding slot positioned on the top of the handle 1, as illustrated in FIG. 12, will hold the three biggest sized hexagonal wrenches for which the handle 1 is designed. As stated above with regards to FIG. 6, the drawing of FIG. 12 is for illustration purposes only. When in use the handle 1 of the second embodiment of the present invention is designed to work with only one hexagonal wrench at a time.

Figure 13:
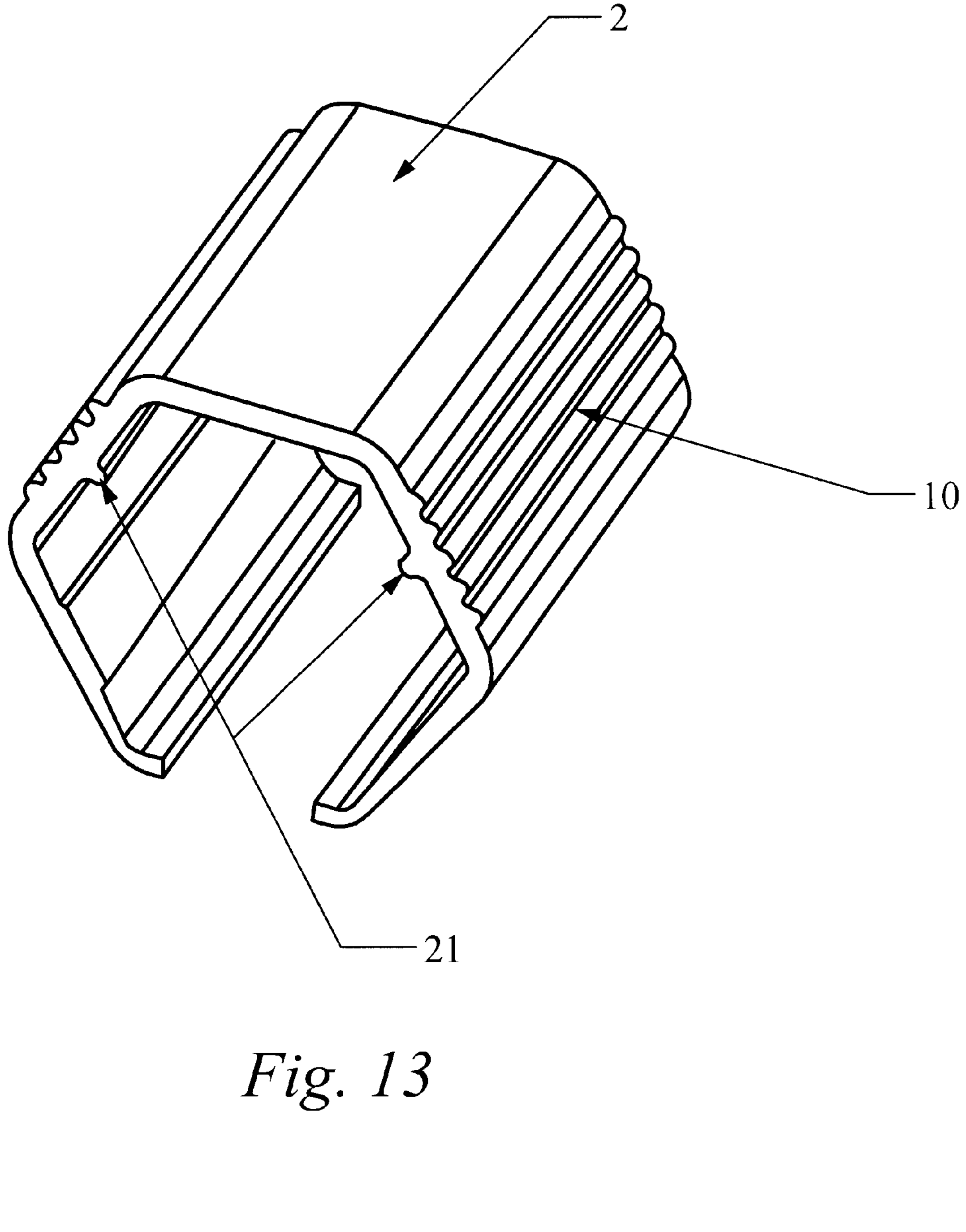
FIG. 13 illustrates a slidable lock having inner ridges according to a second embodiment of the present invention.

FIG. 13 illustrates a perspective view of the slidable lock 2 including inner ridges 21 for engaging the positioning slots 40 of the handle 1. The slidable lock 2 with inner ridges 21 is constructed so that the bottom of the lock 2 is smaller than the top of the lock in order to give the lock 2 a natural spring-like property which locks it to the handle 1.

Figure 14:
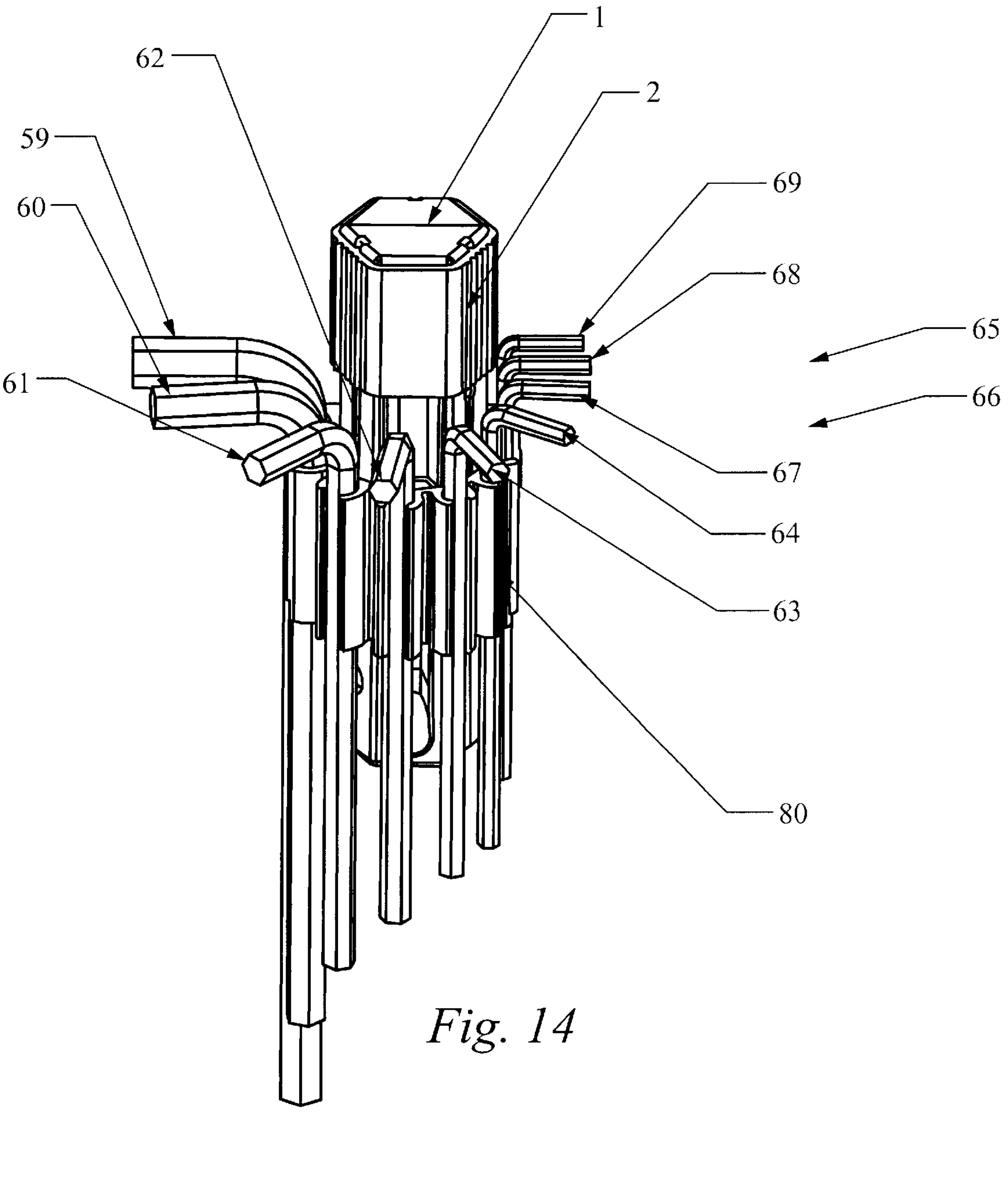
FIG. 14 illustrates a multiple hexagonal wrench holder and a slidable lock coupled to a tool handle according to a second embodiment of the present invention.
Figure 15:
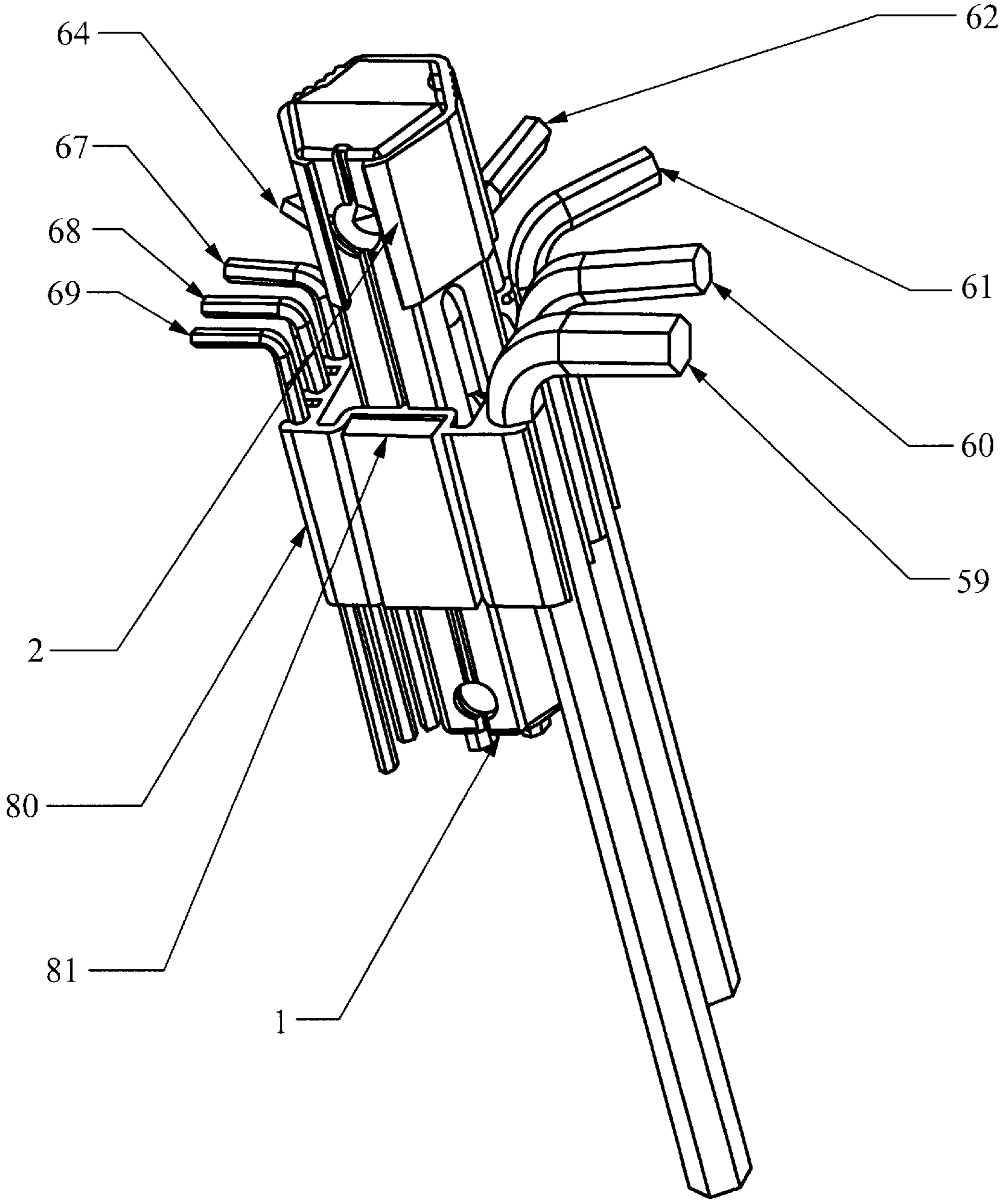
FIG. 15 illustrates a perspective view of a multiple hexagonal wrench holder with mounting magnet and a slidable lock coupled to a tool handle according to a second embodiment of the present invention.
Figure 16:
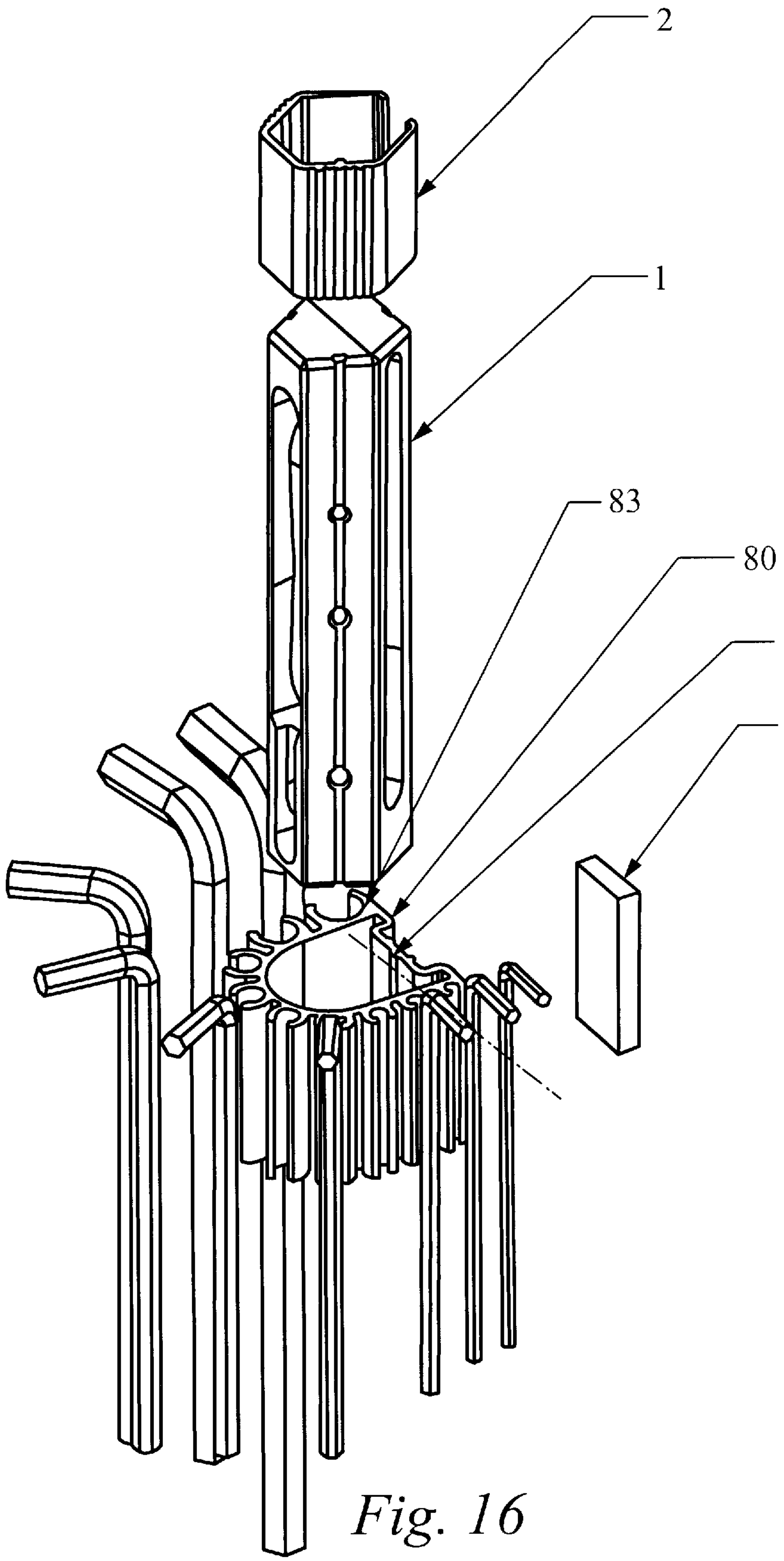
FIG. 16 illustrates the insertion of a tool handle into a multiple hexagonal wrench holder with mounting magnet according to a second embodiment of the present invention.

FIGS. 14, 15 and 16 illustrate a multiple hexagonal wrench holder 80 which is designed to slide over the handle 1 of the second embodiment of the present invention, when it is not in use, and to hold multiple sizes of hexagonal wrenches which may be used with the handle 1. The holder 80 includes multiple spring-urged holders 83, each for holding a different size of hexagonal wrench. The wrench holder 80 also includes a mounting magnet 81 for mounting the handle 1 and the holder 80 to a magnetic surface for storage. The holder 80 is designed so that when it is positioned on the handle 1, the slidable lock 2 may also be positioned on the handle 1. In this manner, each of the necessary components including the handle 1, the wrench holder 80 with multiple sizes of hexagonal wrenches and the slidable lock 2 are stored as a single unit.

The wrench holder 80 also includes an inner ridge 82 for engaging one of the positioning slots 40 on the handle 1 to keep the holder 80 from rotating on the handle 1. The wrench holder 80 is designed so that the inner ridge 82 will slide within any of the positioning slots 40. The inner diameter of the wrench holder 80 is slightly smaller than the diameter of the handle 1. However, the wrench holder 80 is expandably flexible allowing it to expand to accept and tightly engage the handle 1. This tight fit will prevent the handle 1 from inadvertently slipping out of the multiple wrench holder 80.

The multiple wrench holder 80 is preferably materially composed of a styrene-based material. Alternatively, the multiple wrench holder 80 may also be composed of any appropriate material. The wrench holder 80 is cut from an extrusion, from which multiple wrench holders may be cut.

Figure 17:
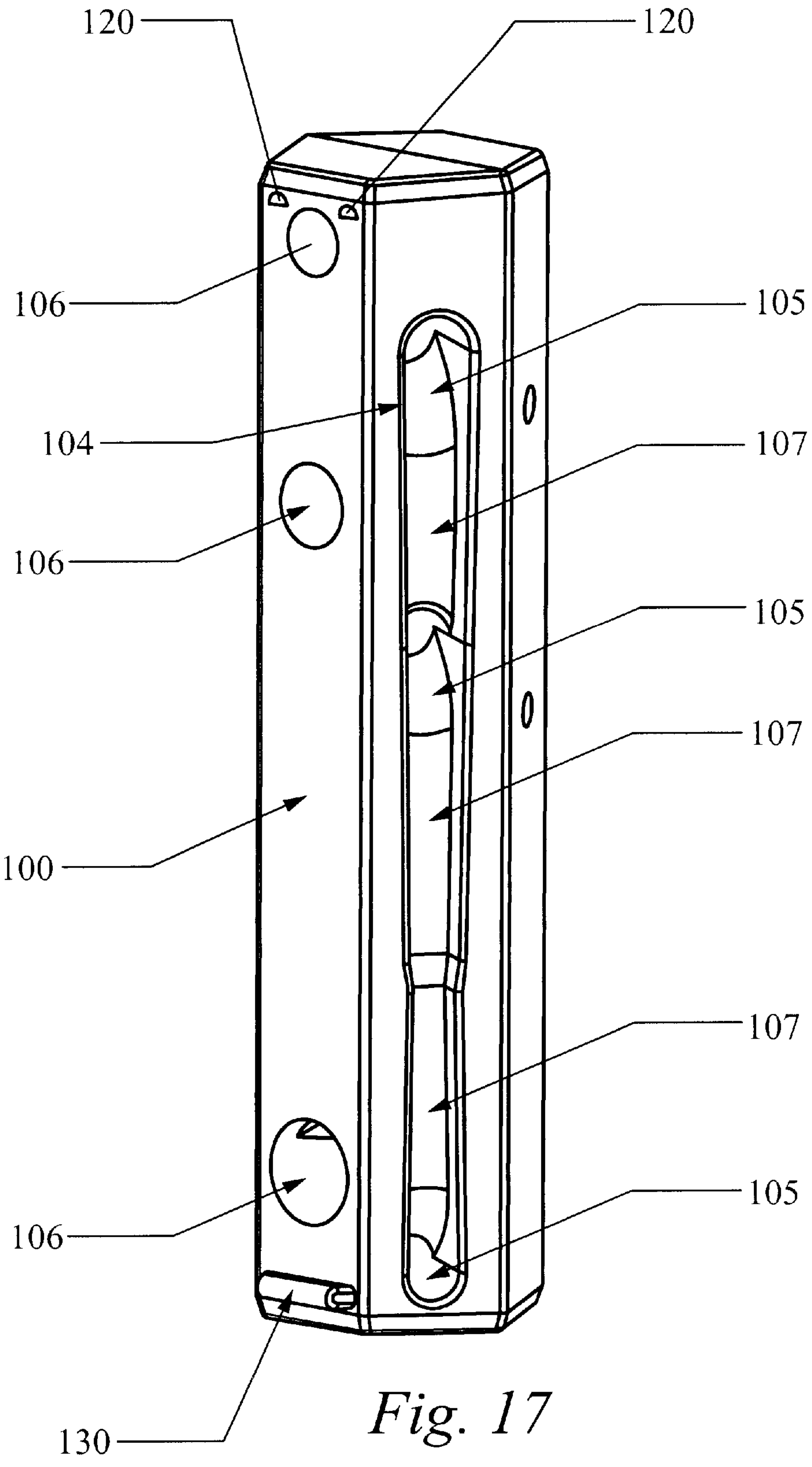
FIG. 17 illustrates a perspective view of a tool handle according to the preferred embodiment of the present invention, showing a holding slot, the contoured compartments, the receiving holes, and the surface barriers.
Figure 18:
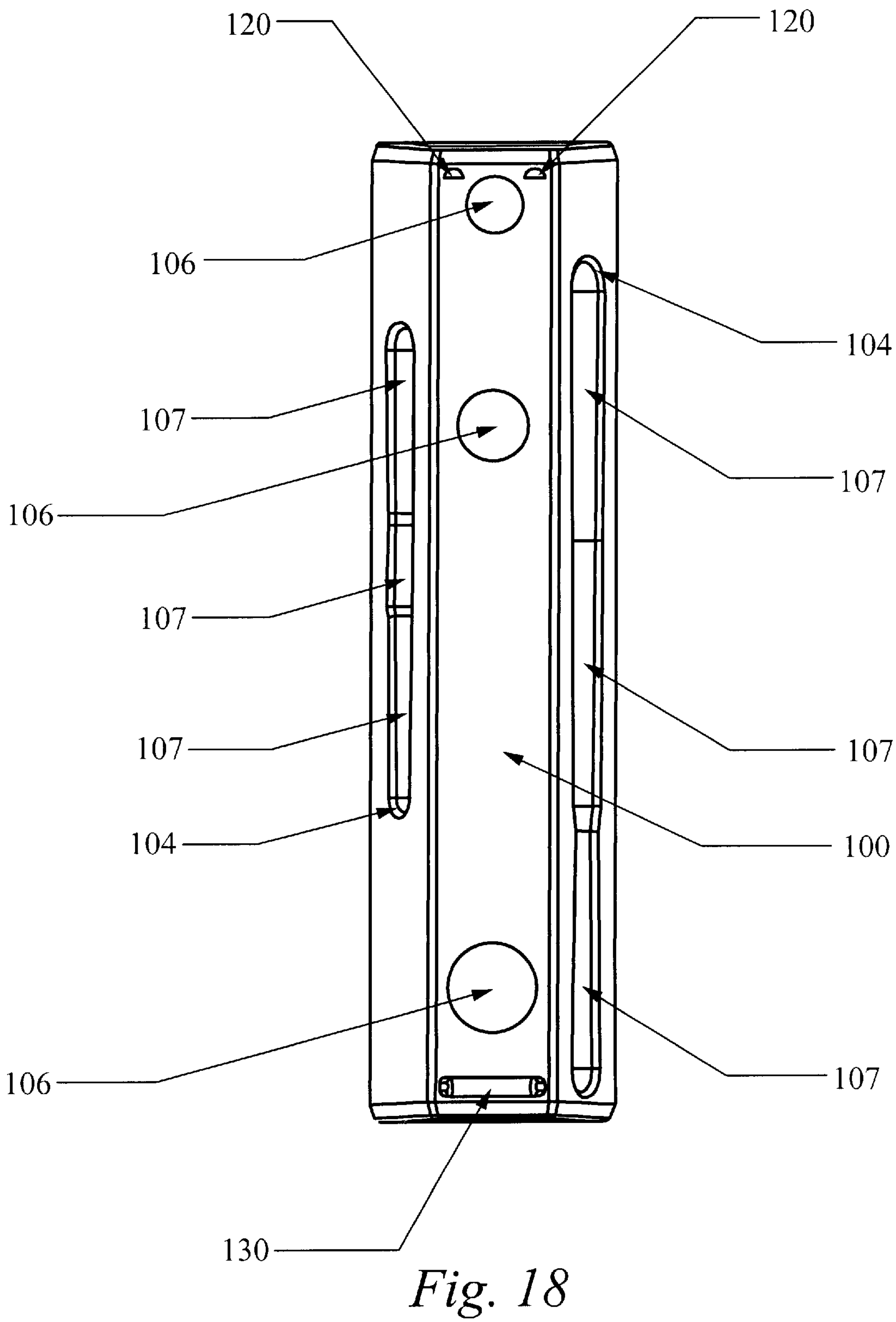
FIG. 18 illustrates a top view of a tool handle according to the preferred embodiment of the present invention.

The tool handle 100 according to the preferred embodiment of the present invention is illustrated in FIGS. 17 and 18. The tool handle 100 is designed to engage and to hold multiple sizes of hexagonal tools, such as hexagonal wrenches. Other types of tools and other types of tool shapes may also be used with the tool handle 100 such as screwdrivers, socket wrenches, and non-hexagonal shaped tools, as described above. In practice, the tool handle 100 engages and holds one tool at a time.

The tool handle 100 according to the preferred embodiment includes a plurality of outer surface faces. Each one of a predetermined number of the outer surface faces has a holding slot 104 integrally formed along the outer surface face. A tool such as a hexagonal wrench having a size corresponding to a size of the holding slot 104 is inserted into the holding slot 104 as described above, e.g., by first inserting the long leg or proximal end. Although the tool handle 100 according to the preferred embodiment of the present invention includes a hexagonal shape with six outer surface faces, three of which have a holding slot 104, it should be understood by those skilled in the art that the tool handle 100 may be designed with more than or less than six outer surface faces. Similarly, it should be understood by those skilled in the art that the tool handle 100 may be designed with more than or less than three outer surface faces having a holding slot 104. In addition, it should be understood by those skilled in the art that an outer surface face may accommodate more than one holding slot 104 by changing a dimension of the outer surface face or a dimension of the holding slot 104.

In the preferred embodiment, each holding slot 104 includes one or more receiving holes 105, or apertures. Each receiving hole 105 is formed through a bottom of the holding slot 104 and penetrates through a width of the tool handle 100. Associated with each receiving hole 105 is a corresponding egress 106 located in a diametrically opposed parallel outer surface face. FIGS. 17 and 18 illustrate the receiving hole 105 but do not show the corresponding egress associated with the shown receiving hole 105 since the diametrically opposed parallel outer surface face is not shown. Similarly, FIGS. 17 and 18 illustrate the corresponding egress 106 but do not show the receiving hole associated with the shown corresponding egress 106 since the diametrically opposed parallel outer surface face is not shown. In practice, the receiving hole 105 accepts the proximal end of the hexagonal wrench which is inserted into the holding slot 104. The proximal end passes through the receiving hole 104 and protrudes from the corresponding egress 106 located in the diametrically opposing outer surface face. Moreover, each receiving hole 105 is configured to accept wrench size or sizes which correspond to a defined range of sizes—including both English sizes and metric sizes. As will be apparent to those skilled in the art, the receiving hole 105 may be designed to accept only wrenches having English sizes or only wrenches having metric sizes. Although in the preferred embodiment of the present invention the tool handle 100 is designed so that each holding slot 104 is located on an outer surface face unpenetrated by a corresponding egress 106, it should be understood by those skilled in the art that the tool handle 100 can be designed so that an outer surface face includes a holding slot 104 as well as a corresponding egress 106 which is associated with the receiving hole 105 of a diametrically opposed parallel outer surface face.

In the preferred embodiment, each holding slot 104 further includes one or more contoured compartments 107. As described above, this design choice accommodates hexagonal wrenches of different dimensions from multiple manufacturers. Each contoured compartment 107 is formed about a corresponding receiving hole 105. In practice, the proximal end of a hexagonal wrench is inserted into the holding slot 104 and through the receiving hole 105 until the mounting end of the hexagonal wrench rests in the contoured compartment 107 corresponding to the receiving hole 105. Each contoured compartment 107 is configured to hold wrench size or sizes which correspond to the defined range of sizes associated with the corresponding receiving hole 105. Specifically, each contoured compartment 107 has a size and dimension as well as surface contours designed to minimize movement of the mounting end once the mounting end is seated in the contoured compartment 107. As described above, in the tool handle 100 of the preferred embodiment the contoured compartments 107 within a holding slot 104 accommodate hexagonal wrenches of close sizes, thus promoting efficient distribution of the holding slots 104 and facilitating construction of the tool handle 100.

Preferably, the tool handle 100 of the present invention further includes a plurality of instructional figures molded into, printed on, or engraved into the tool handle 100. These instructional figures aid a user in properly using the tool handle 100. Preferably, the size of the hexagonal wrench which corresponds to the contoured compartment 107 is molded into, printed on, or engraved into the tool handle 100 to aid the user in efficiently finding the appropriate contoured compartment 107 for the necessary hexagonal wrench.

Preferably, the tool handle 100 of the present invention is designed to have dimensions which provide a comfortable, user-friendly interface to a user's hand.

In FIGS. 17 and 18, the tool handle 100 of the preferred embodiment of the present invention includes a first surface barrier 120 and a second surface barrier 130. The first and second surface barriers will be fully described below.

Once the hexagonal wrench is engaged with the tool handle 100 as described above, e.g., the proximal end passed through an appropriately sized receiving hole 105 until the mounting end rests in the contoured compartment 107 corresponding to the appropriately sized receiving hole 105, a user can use the tool handle 100 by placing his hand over the contoured compartment 107 holding the mounting end to confine the mounting end to the contoured compartment 107 and gripping the outer surface faces of the tool handle 100. Although this manner of using the tool handle 100 is available, the preferred embodiment of the present invention includes a movable lock which is configured for selectively positioning on the outer surface faces. The movable lock is positioned over the contoured compartment 107 to irremovably confine the mounting end to the contoured compartment 107. Thus, the movable lock allows the user to focus on comfortably positioning his hand on the tool handle 100 in order to transmit the necessary force to the hexagonal wrench held by the tool handle 100 and further protects the user's hand.

Figure 19:
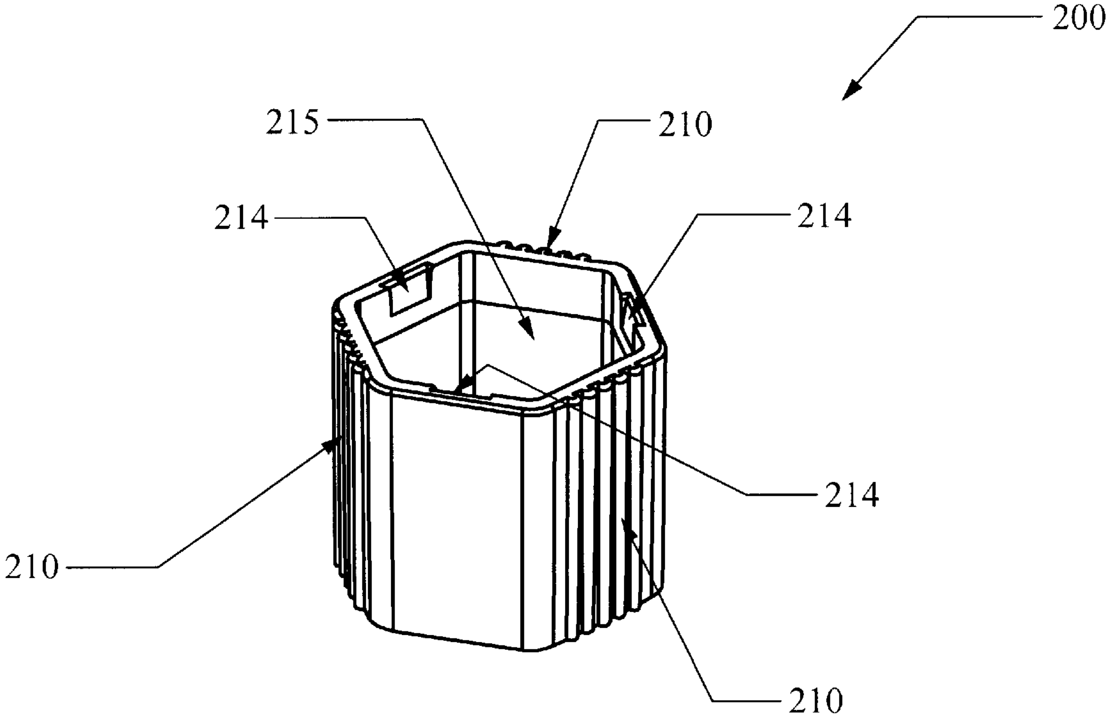
FIG. 19 illustrates a perspective view of a lock having external ridges according to the preferred embodiment of the present invention.

A configuration for the movable lock 200 according to the preferred embodiment of the present invention is illustrated in FIG. 19. The movable lock 200 includes a surface which forms a cavity 215. The cavity 215 has a shape corresponding to a shape of the tool handle 100. In practice, the movable lock 200 is coupled to the tool handle 100 by inserting the tool handle 100 through the cavity 215. The movable lock 200 has an outer surface and an inner surface. Preferably, the movable lock 200 includes a plurality of external ridges 210 on the outer surface and at least one recess 214 located on the inner surface and at each edge of the movable lock 200. The external ridges 210 assist the user in positioning the movable lock 200 along the tool handle 100 and in gripping the tool handle 100. Each recess 214 is positioned on the inner surface of the movable lock 200 to correspond with an outer surface face of the tool handle 100 which has a holding slot 104. In practice, the recess 214 allows the movable lock 200 to be slid over a protruding portion of the mounting end held in the contoured compartment 107 so that the mounting end is irremovably confined to the contoured compartment 107 by the movable lock 200. It should be understood by those skilled in the art that the location of the external ridges 210 and the location of the recesses 214 on the movable lock 200 can be alternately configured.

Figure 20A:
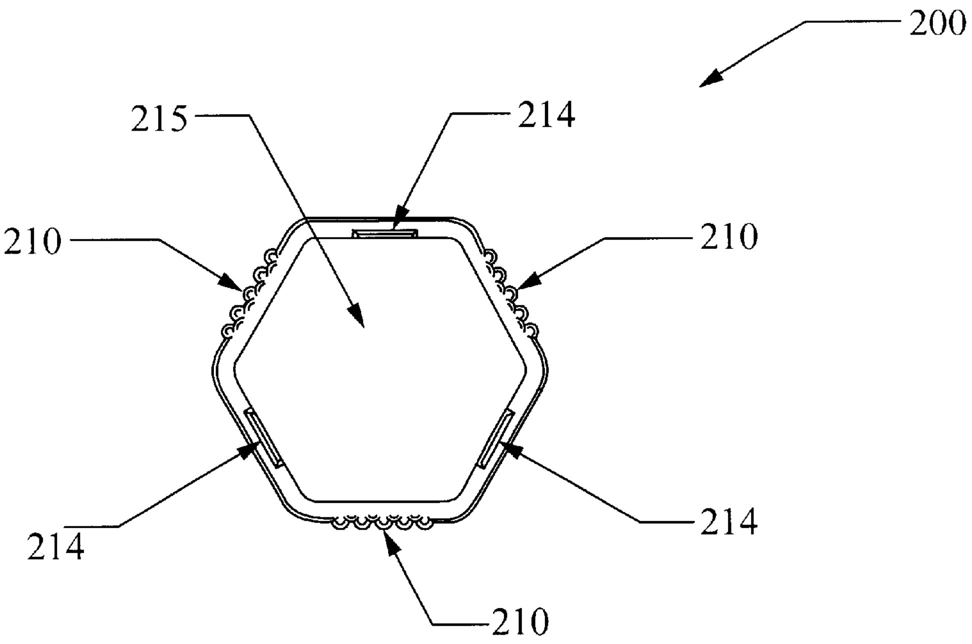
FIG. 20A illustrates a top edge view of a lock according to the preferred embodiment of the present invention, showing the recesses in the inner surface.
Figure 20B:
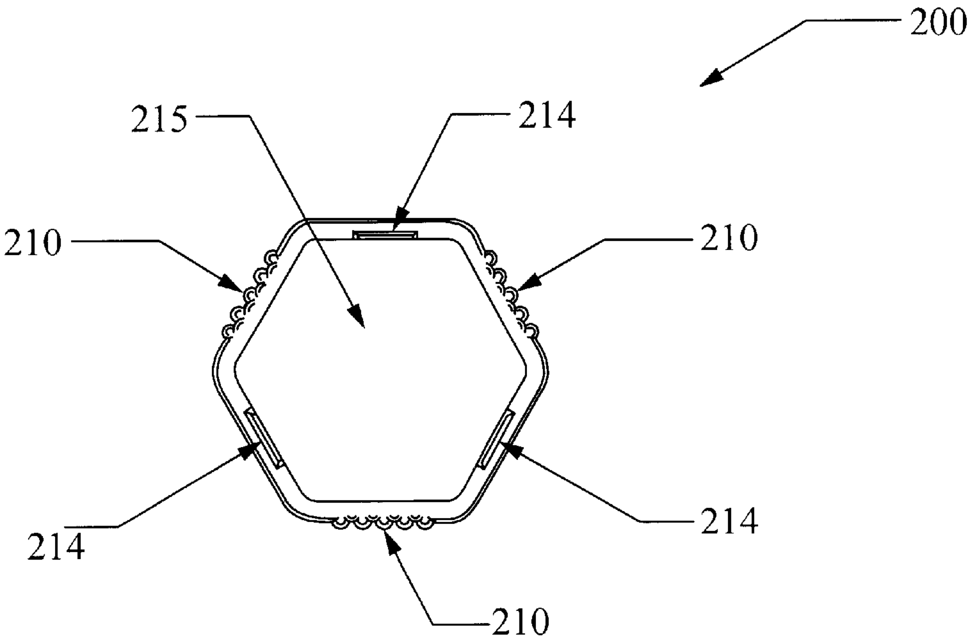
FIG. 20B illustrates a bottom edge view of a lock according to the preferred embodiment of the present invention, showing the recesses in the inner surface.

FIGS. 20A and 20B illustrate respectively the top edge and the bottom edge of the movable lock 200.

Figure 21:
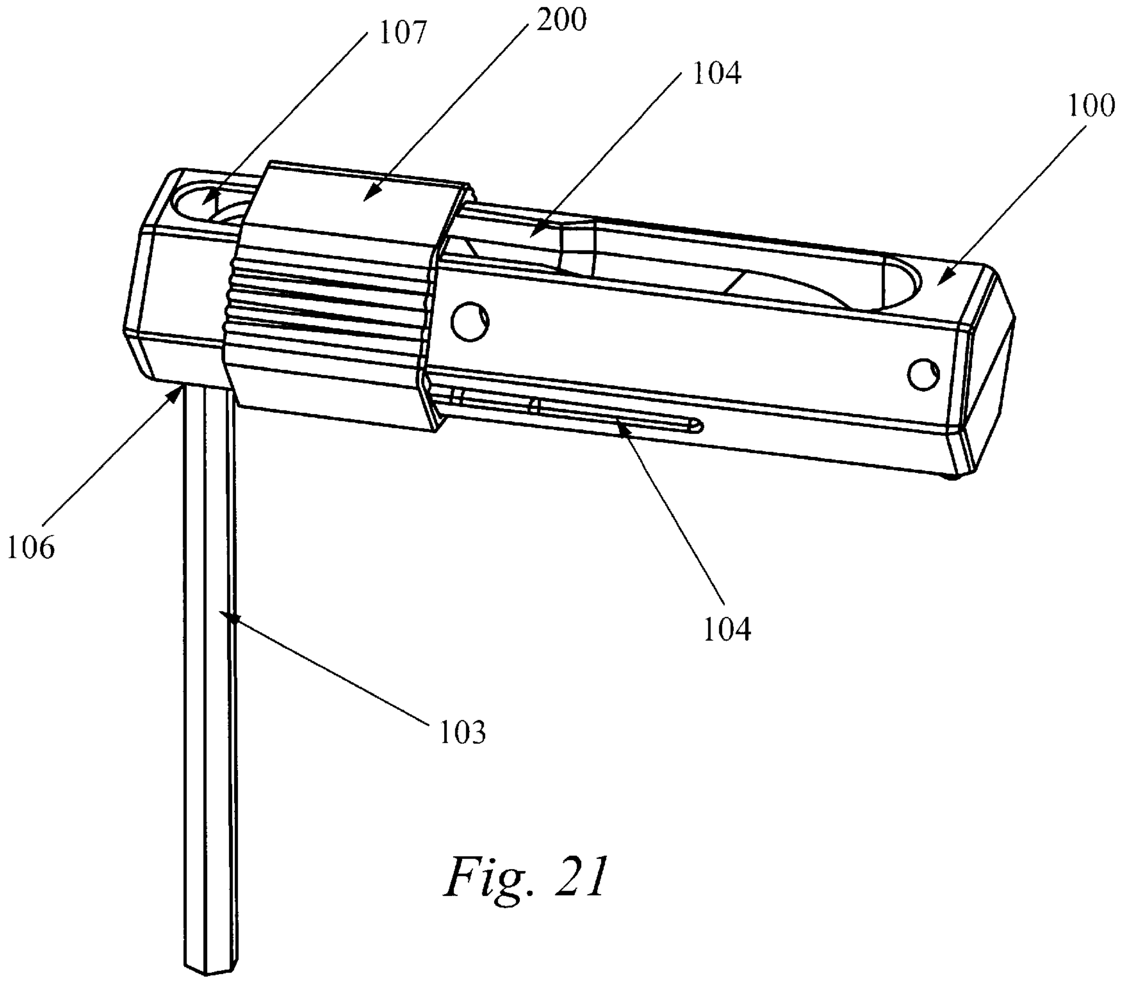
FIG. 21 illustrates a wrench engaged with a tool handle and secured by a lock according to the preferred embodiment of the present invention.

FIG. 21 illustrates a hexagonal wrench 103 engaged with the tool handle 100 and secured by the movable lock 200 according to the preferred embodiment of the present invention. The proximal end protruding from the corresponding egress 106 forms an impenetrable boundary for the movable lock 200. The movable lock 200 cannot be positioned beyond the proximal end protruding from the corresponding egress 106.

Figure 22:
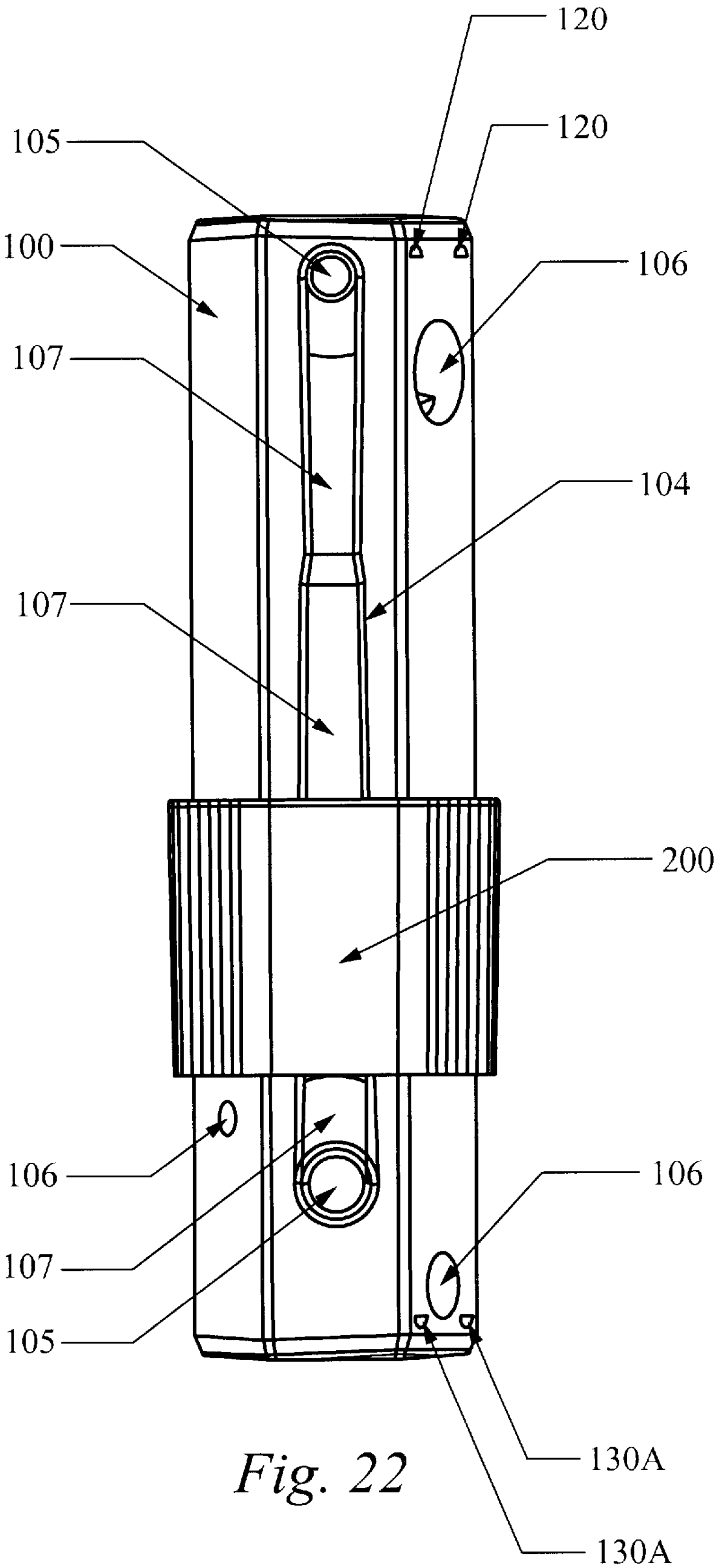
FIG. 22 illustrates a front view of an alternate embodiment for a tool handle according to the present invention, showing a lock coupled to a tool handle and showing an alternate configuration for the surface barriers.

FIG. 22 illustrates an alternate embodiment for the tool handle 100 according to the present invention. This alternate embodiment for the tool handle 100 includes the features previously discussed in connection with FIGS. 17 and 18. However, the second surface barrier 130A of the alternate embodiment, illustrated in FIG. 22, differs from the second surface barrier 130 of the preferred embodiment of the tool handle 100, illustrated in FIGS. 17 and 18.

The surface barriers have been included because, if separated from the tool handle 100, the movable lock 200 can be misplaced or even lost. Thus, the tool handle 100 includes the first surface barrier 120 positioned about the first end of the tool handle 100 and one of the second surface barriers 130 and 130A positioned about the second end of the tool handle 100 as illustrated in FIGS. 17 and 22 in order to conveniently retain the movable lock 200 on the tool handle 100, therefore preventing the movable lock 200 from being separated from the tool handle 100 and getting misplaced or lost. The first surface barrier 120 is configured to allow the movable lock 200 to pass over the first surface barrier 120 when approaching the first surface barrier 120 from an uncoupled direction, e.g., when attempting to couple the movable lock 200 to the tool handle 100 over the end of the tool handle 100 including the first surface barrier 120. The outer surface of the first surface barrier 120 is curved to allow the movable lock 200 to slide over the first surface barrier 120 from the uncoupled direction. Preferably, the first surface barrier 120 is configured to prevent the movable lock 200 from passing over the first surface barrier 120 when approaching the first surface barrier 120 from a coupled direction, e.g., when attempting to uncouple the movable lock 200 from the tool handle 100 by sliding it over the end of the tool handle 100 including the first surface barrier 120. The inner surface of the first surface barrier 120 is formed perpendicular to the surface of the tool handle 100 to form a stop and prevent the movable lock 200 from sliding over the first surface barrier 120 after being positioned on the tool handle 100.

The second surface barrier 130 of the preferred embodiment and the second surface barrier 130A of the alternate embodiment are configured to prevent the movable lock 200 from passing over either the preferred second surface barrier 130 or the alternate second surface barrier 130A when approaching either the preferred second surface barrier 130 or the alternate second surface barrier 130A from the coupled direction. The preferred second surface barrier 130 is also configured to prevent the movable lock 200 from passing over the preferred second surface barrier 130 when approaching the preferred second surface barrier 130 from the uncoupled direction. Both sides of the preferred second surface barrier 130 are formed perpendicular to the surface of the tool handle 100 to form a stop and prevent the movable lock 200 from sliding over the preferred second surface barrier 130 from either the coupled direction or the uncoupled direction. The alternate second surface barrier 130A is configured to allow the movable lock 200 to pass over the alternate second surface barrier 130A from the uncoupled direction. The outer surface of the alternate second surface barrier 130A is curved to allow the movable lock 200 to slide over the alternate second surface barrier 130A from the uncoupled direction. The inner surface of the alternate second surface barrier 130A is formed perpendicular to the surface of the tool handle 100 to form a stop and prevent the movable lock 200 from sliding over the alternate second surface barrier 130A after being positioned on the tool handle 100.

Together, the surface barriers 120 and 130(or 130A) retain the movable lock 200 on the tool handle 100.

As described above, the present invention includes a tool holder designed to hold the tool handle 100 of the present invention and to hold multiple sizes of tools, such as hexagonal wrenches, which may be used with the tool handle 100. The tool holder may hold other types of tools and other types of tool shapes.

Figure 23A:
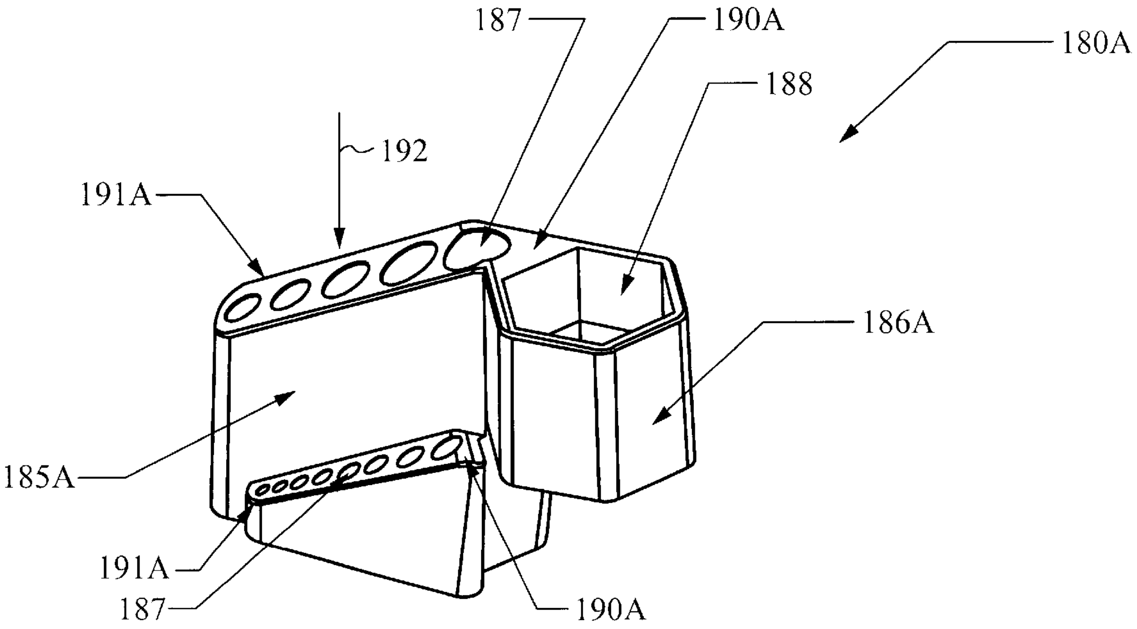
FIG. 23A illustrates a perspective view of a first portion of a tool holder according to the preferred embodiment of the present invention.
Figure 23B:
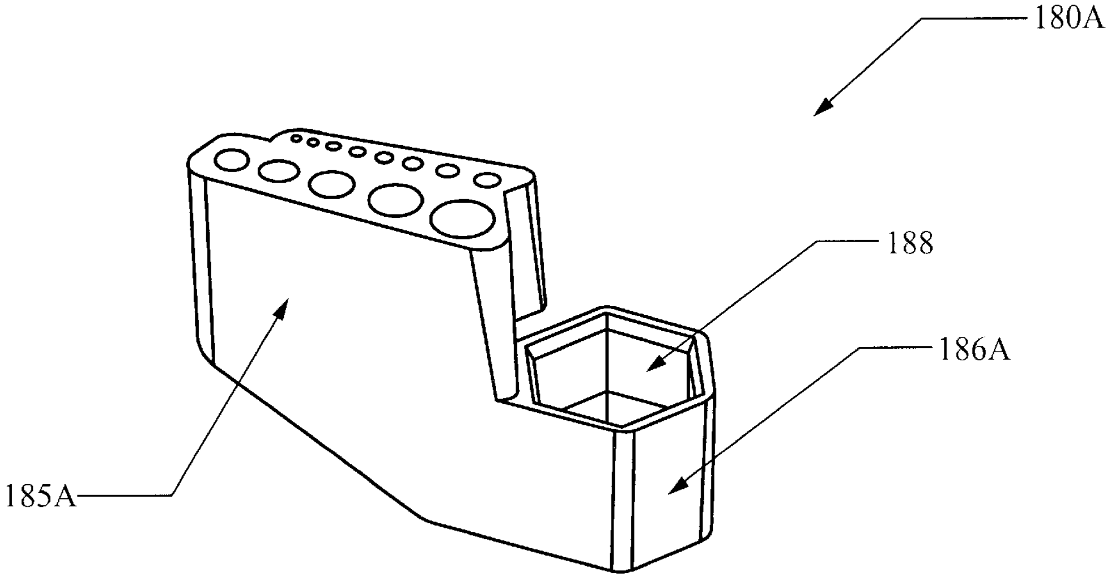
FIG. 23B illustrates a bottom view of a first portion of a tool holder according to the preferred embodiment of the present invention.

FIGS. 23A and 23B illustrate a first portion of the preferred embodiment of the tool holder 180A. The tool holder 180A includes a tool holding member 185A and a tool handle holding member 186A. The tool holding member 185A is configured to securely hold the hexagonal wrenches or other tools upon insertion into the tool holding member 185A. The tool handle holding member 186A is configured to hold the tool handle 100 adjacent to the tool holding member 185A. The tool handle holding member 186A is coupled to the tool holding member 185A.

Preferably, the tool holding member 185A includes a first upper surface and a second upper surface offset from the first upper surface. Moreover, the tool holding member 185A further includes a plurality of cavities 187 formed through the first upper surface and penetrating the tool holding member 185A along an insertion axis 192, and formed through the second upper surface and penetrating the tool holding member 185A along the insertion axis 192. Each of the cavities 187 is configured to hold a corresponding sized hexagonal wrench. In practice, a hexagonal wrench is inserted and held in a cavity 187 corresponding to the size of the hexagonal wrench. More particularly, each of the cavities 187 has a cross section dimension along the insertion axis 192 which is smaller than a dimension of a diameter of the corresponding hexagonal wrench so that the cavity 187 provides resistance against insertion therein of the corresponding hexagonal wrench and against removal of the corresponding hexagonal wrench to securely hold the corresponding hexagonal wrench therein.

Additionally, the first upper surface of the tool holding member 185A includes a peak end 190A and a base end 191A, and a slope between the peak end 190A and the base end 191A. Also, the second upper surface of the tool holding member 185A includes a peak end 190A and a base end 191A, and a slope between the peak end 190A and the base end 191A. Preferably, the peak end 190A of the first upper surface is adjacent to the peak end 190A of the second upper surface. Preferably, the base end 191A of the first upper surface is adjacent to the base end 191A of the second upper surface.

Preferably, the tool handle holding member 186A includes an inner hollow shape 188 corresponding to the shape of the tool handle 100. In practice, the tool handle 100 is held by the tool handle holding member 186A by inserting the tool handle 100 through the inner hollow shape 188.

The first portion of the tool holder 180A includes a tool handle holding member 186A which is coupled adjacent to the first upper surface and about the peak end 190A of the tool holding member 185A. It should be understood by those skilled in the art that the tool handle holding member 186A can be coupled at different locations on the tool holding member 185A.

Figure 24A:
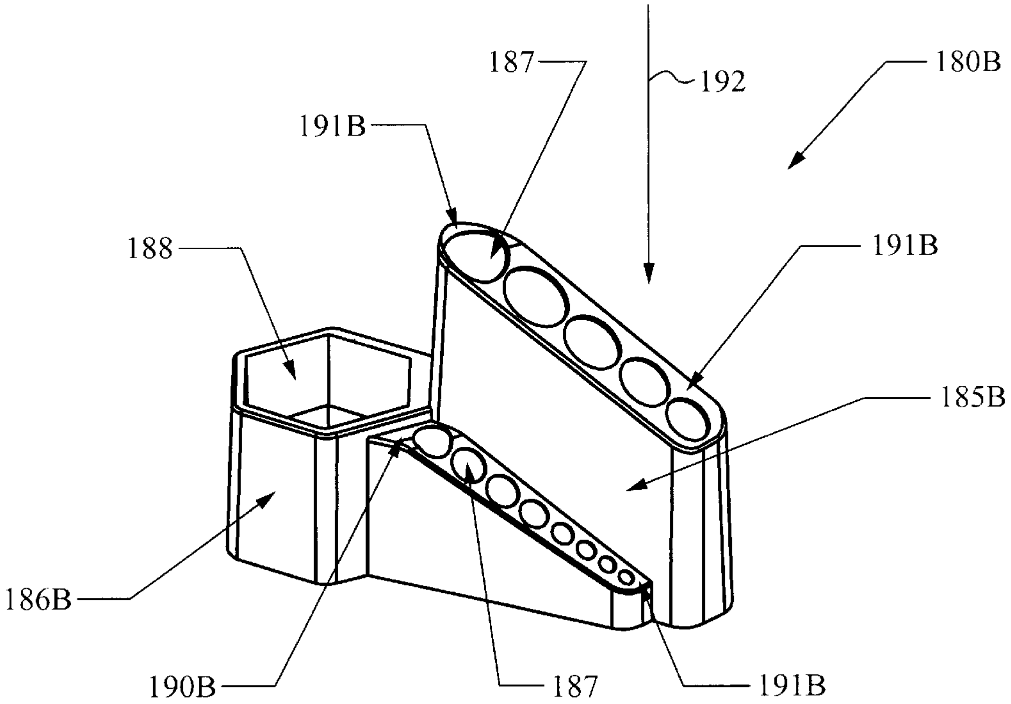
FIG. 24A illustrates a perspective view of a second portion of a tool holder according to the preferred embodiment of the present invention.
Figure 24B:
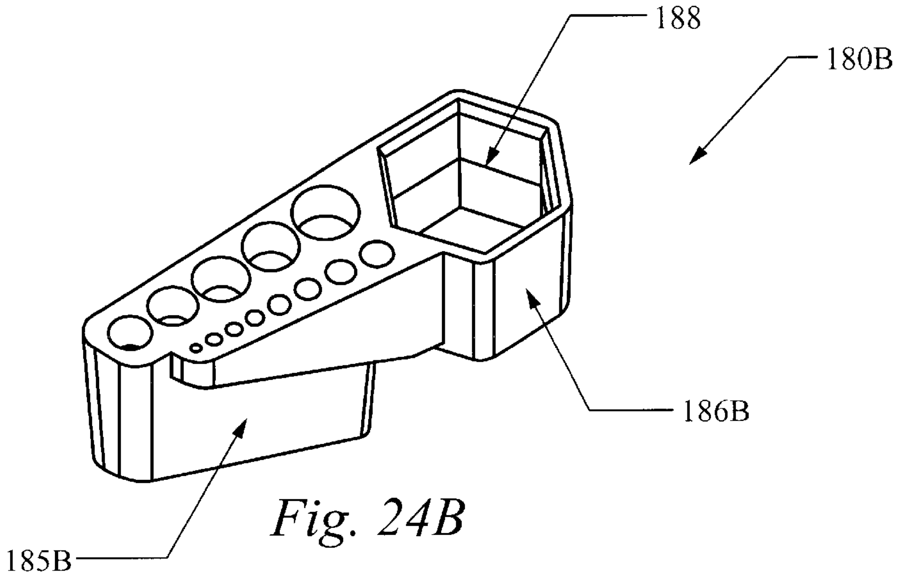
FIG. 24B illustrates a bottom view of a second portion of a tool holder according to the preferred embodiment of the present invention.

FIGS. 24A and 24B illustrate a second portion of the tool holder 180B. The second portion of the tool holder 180B includes the features previously discussed in connection with the first portion of the tool holder 180A in FIGS. 23A and 23B. However, the tool handle holding member 186B of the second portion of the tool holder 180B is coupled adjacent to the second upper surface and about the peak end 190B of the tool holding member 185B of the second portion of the tool holder 180B. Additionally, the slope of the first and second upper surfaces of the second portion of the tool holder 180B is reverse relative to the slope of the first and second upper surfaces of the first portion of the tool holder 180A.

Preferably, the size of the hexagonal wrench 103 which corresponds to the cavity 187 is molded into, printed on, or engraved into each of the configurations for the tool holder 180A and 180B to aid the user in efficiently finding the appropriate cavity 187 for inserting therein the hexagonal wrench 103.

Figure 25:
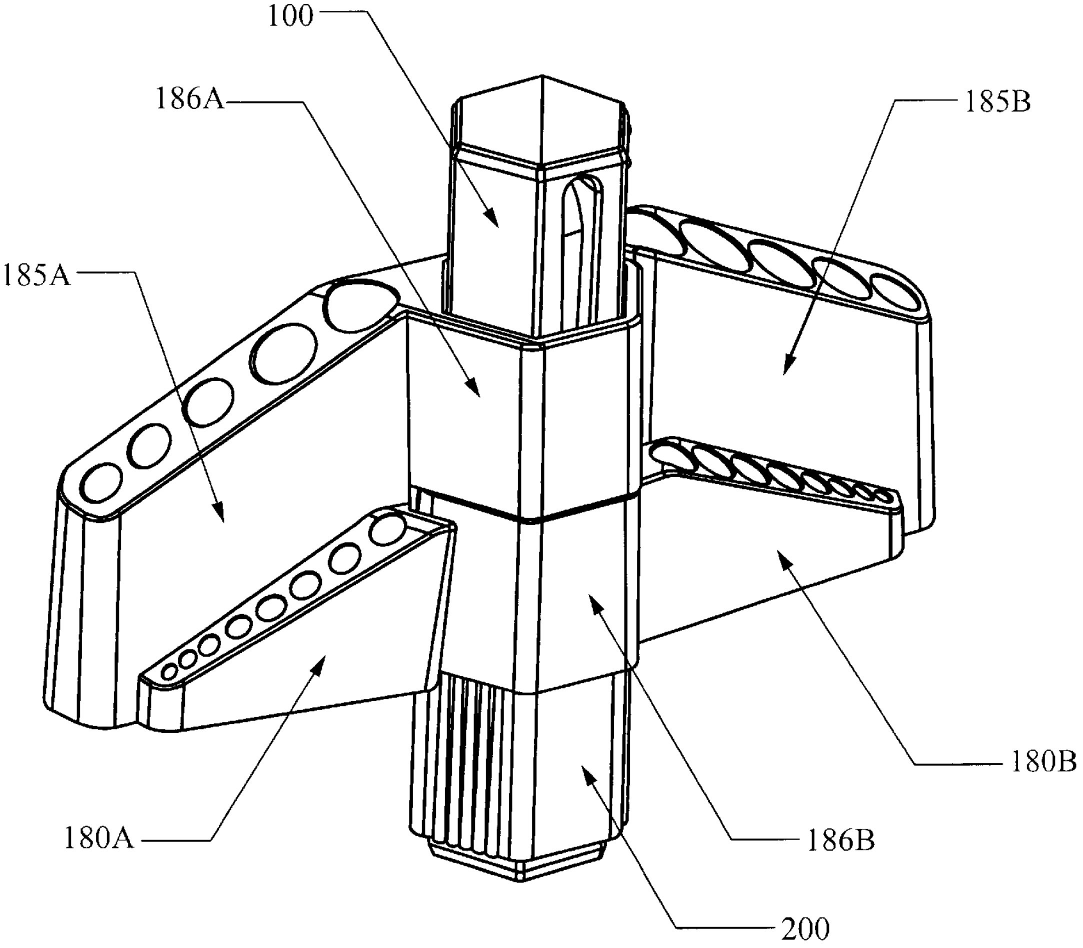
FIG. 25 illustrates a front perspective view of a tool handle, a lock, a first portion of a tool holder, and a second portion of a tool holder according to the preferred embodiment of the present invention.
Figure 26:
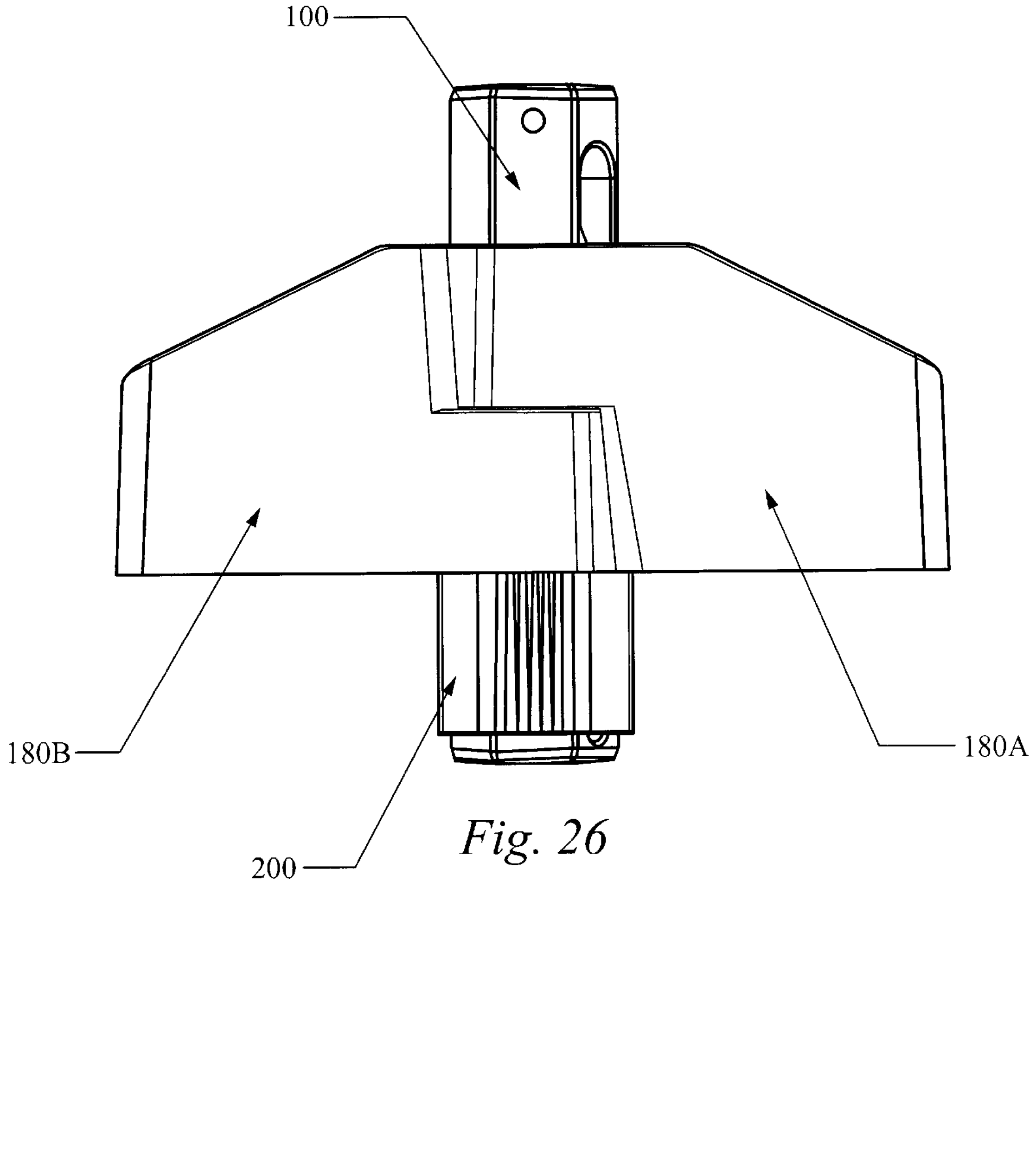
FIG. 26 illustrates a back elevation view of a tool handle, a lock, a first portion of a tool holder, and a second portion of a tool holder according to the preferred embodiment of the present invention.

FIGS. 25 and 26 illustrate respectively the front view and the back view of the tool handle 100, the movable lock 200, the first tool holder 180A, and the second tool holder 180B according to the preferred embodiment of the present invention. However, an assembly having only one tool holder is an alternate configuration of the present invention. Preferably, the first tool holder 180A holds hexagonal wrenches of English sizes while the second tool holder 180B holds hexagonal wrenches of metric sizes. Alternate configurations are possible. Here, the second tool holder 180B is inserted over the tool handle 100 before the first tool holder 180A is inserted, thus forming a compact arrangement wherein the tool holding members 185A and 185B are aligned about an axis formed by the tool handle 100. It should be understood by those skilled in the art that the angle formed by the tool holding members 185A and 185B in the compact arrangement can be a value other than 180 degrees since each of the tool handle holding members 186A and 186B can be rotated about the axis formed by the tool handle 100 before being inserted over the tool handle 100 in order to form other angle values.

Figure 27:
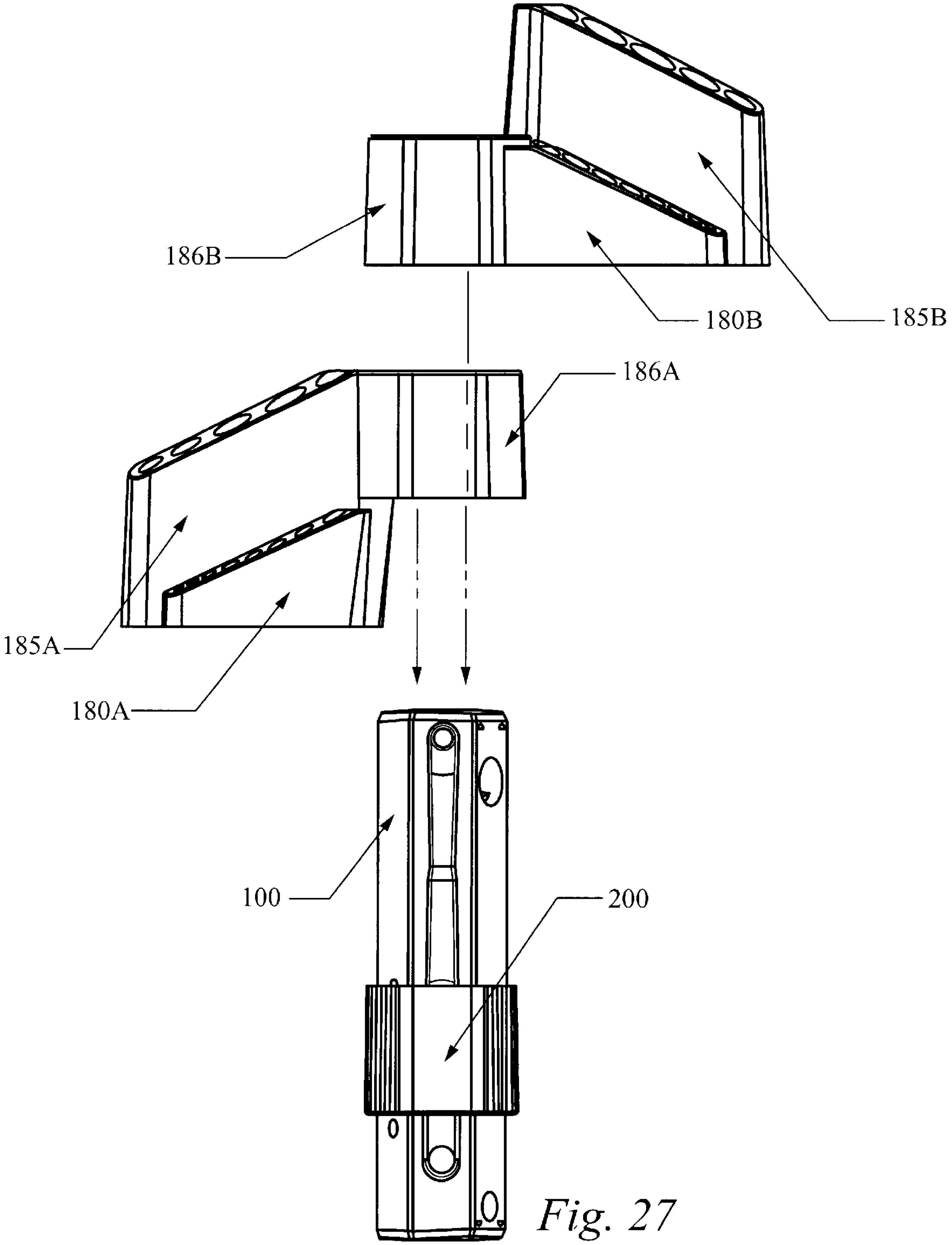
FIG. 27 illustrates an alternate insertion relationship among a tool handle, a lock, a first portion of a tool holder, and a second portion of a tool holder according to the present invention.

FIG. 27 illustrates an alternate insertion relationship among the tool handle 100, the movable lock 200, the first tool holder 180A, and the second tool holder 180B. In this insertion relationship, the first tool holder 180A is inserted over the tool handle 100 before the second tool holder 180A is inserted, thus the compact arrangement as seen in FIGS. 25 and 26 is not formed. In particular, FIG. 27 shows that formation of the compact arrangement is dependent on the sequence in which each of the tool handle holding members 186A and 186B is inserted over the tool handle 100.

Figure 28:
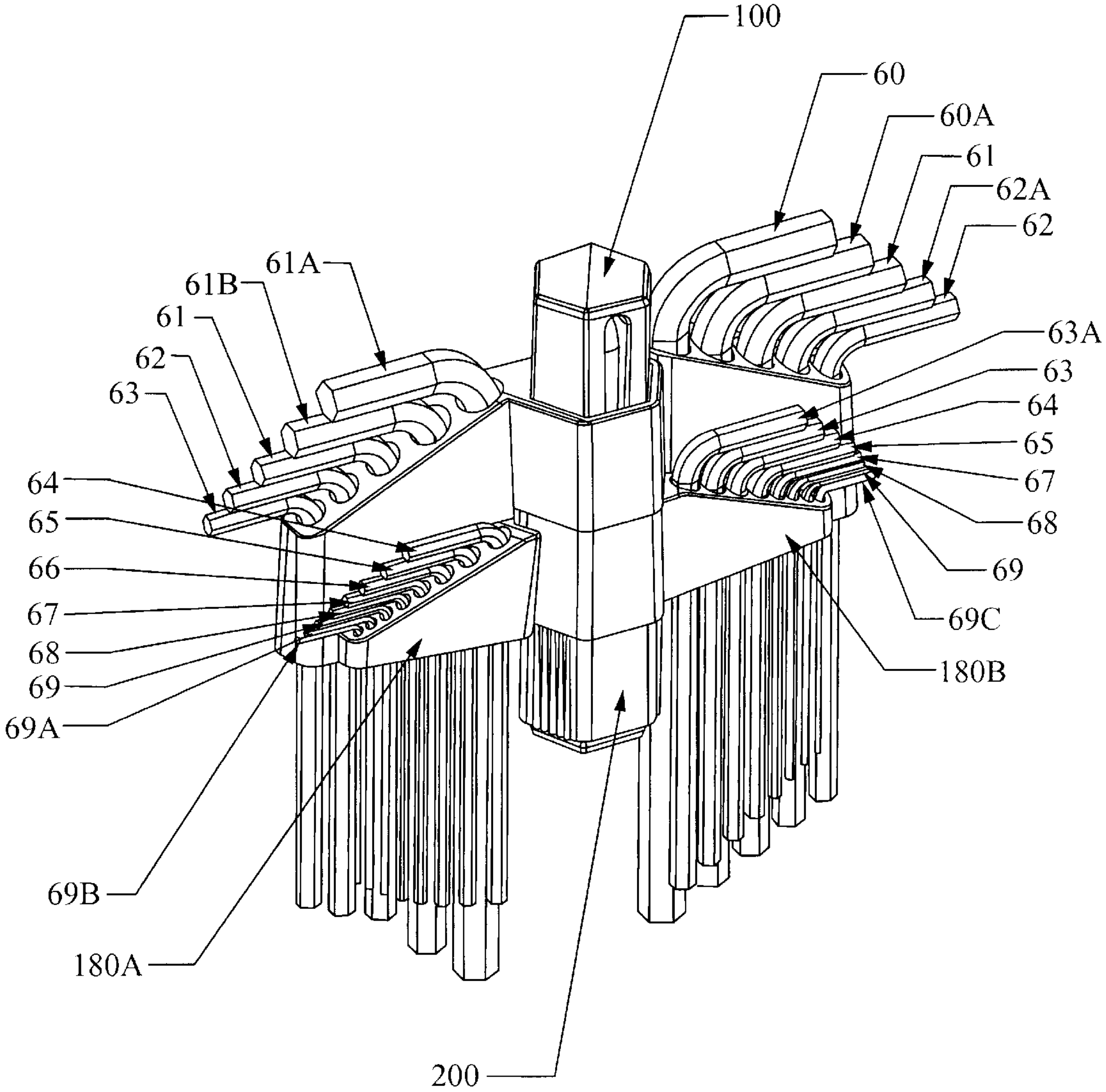
FIG. 28 illustrates a front perspective view of a relationship between hexagonal wrenches and the tool handle, lock and tool holder of the present invention.
Figure 29:
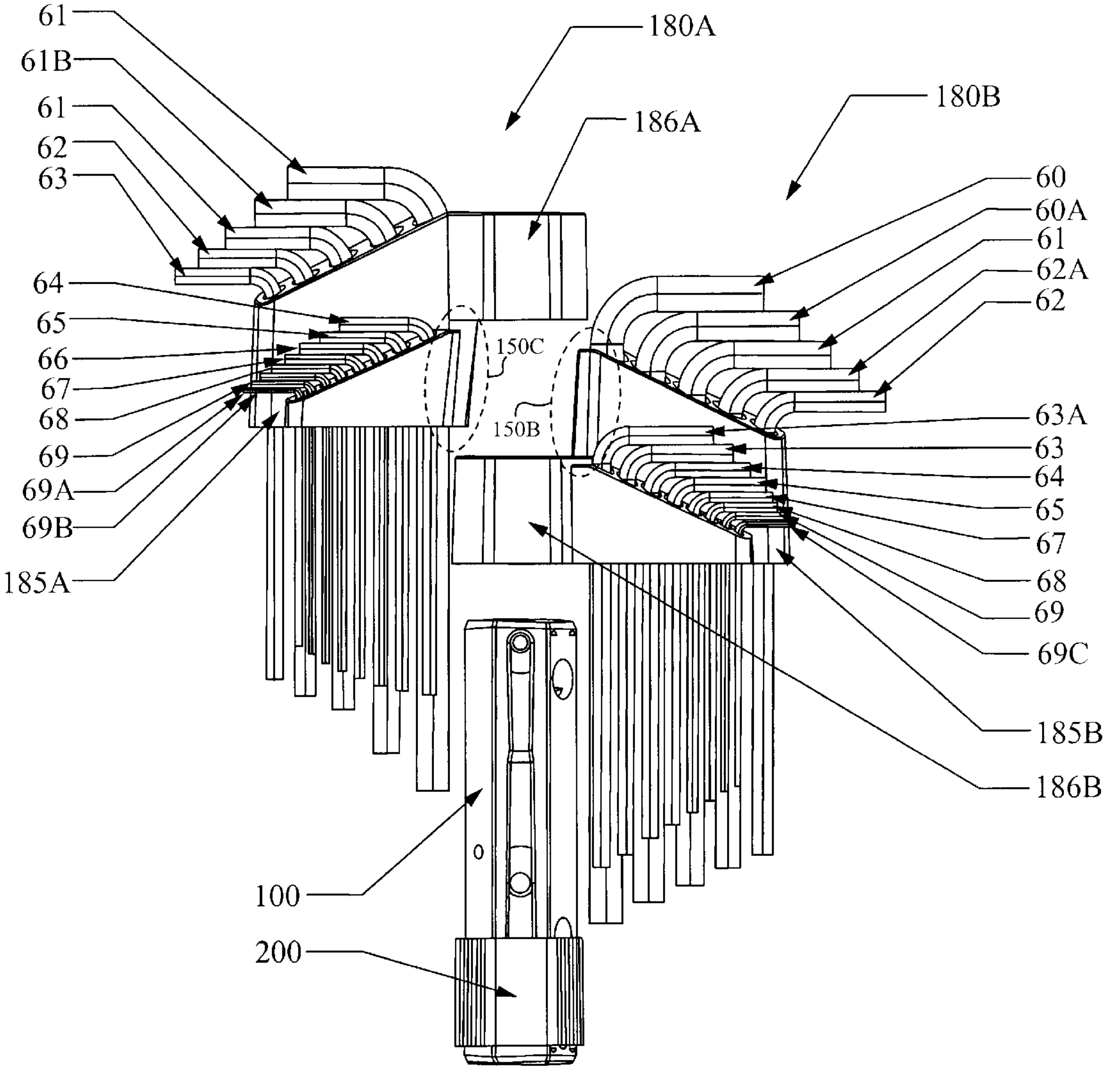
FIG. 29 illustrates a preferred insertion relationship among a tool handle, a lock, a first portion of a tool holder, and a second portion of a tool holder for forming a compact arrangement according to the present invention.

FIGS. 28 and 29 illustrate the hexagonal wrenches as held in the preferred embodiment of the tool holder of the present invention. In addition to the hexagonal wrench sizes discussed above, the hexagonal wrench sizes include the following English sizes: a ⅜ inch wrench 61A, a 5/16 inch wrench 61B, a 1/16 inch wrench 69A, and a 1/20 inch wrench 69B. In addition, the hexagonal wrench sizes include the following metric sizes: a 9 mm wrench 60B, a 7 mm wrench 62A, a 5.5 mm wrench 63A, and a 1.5 mm wrench 69C.

In particular, FIG. 29 illustrates how the tool holding member 185A of the first tool holder 180A is configured to mate with the tool handle holding member 186B of the second tool holder 180B, thus forming the compact arrangement. In addition, FIG. 29 illustrates how the tool holding member 185B of the second holder 180B is configured to mate with the tool handle holding member 186A of the first tool holder 180A, thus forming the compact arrangement. The tool holding member 185A of the first tool holder 180A is contoured in region 150C to fit the shape of the tool handle holding member 186B of the second tool holder 180B. Similarly, the tool holding member 185B of the second tool holder 180B is contoured in region 150B in order to allow the surface of the tool handle holding member 186A of the first tool holder 180A to securely rest against the tool holding member 185B of the second tool holder 180B.

Besides conveniently retaining the movable lock 200 coupled to the tool handle 100, the first surface barrier 120 and each of the second surface barriers 130 and 130A facilitate mounting the tool handle 100, the movable lock 200, and the tool holder 180A and 180B on a wall. Each of the second surface barriers 130 and 130A is configured to prevent each of the tool handle holding members 186A and 186B from passing over any of the second surface barriers 130 and 130A when approaching any of the second surface barriers 130 and 130A from the coupled direction, e.g., when attempting to uncouple each of the tool handle holding members 186A and 186B from the tool handle 100 through the end of the tool handle 100 including any of the second surface barriers 130 and 130A. Each of the second surface barriers 130 and 130A is configured to prevent each of the tool handle holding members 186A and 186B from passing over any of the second surface barriers 130 and 130A when approaching any of the second surface barriers 130 and 130A from the uncoupled direction, e.g., when attempting to couple each of the tool handle holding members 186A and 186B to the tool handle 100 over the end of the tool handle 100 including any of the second surface barriers 130 and 130A. In addition, the first surface barrier 120 is configured to allow each of the tool handle holding members 186A and 186B to pass over the first surface barrier 120 when approaching the first surface barrier 120 from either the uncoupled direction or the coupled direction. However, the first surface barrier 120 provides resistance against each of the tool handle holding members 186A and 186B passing over the first surface barrier 120 from the coupled direction.

The tool handle 100 and the movable lock 200 of the present invention are materially composed of materials as described above.

Each of the tool holders 180A and 180B is preferably composed of a styrene-based material. Alternately, each of the tool holders 180A and 180B may also be composed of any appropriate material.

It should further be understood by a person skilled in the art that the tool handle of the present invention may be modified or adapted for use with tool drivers and tools having shapes other than hexagonal. Further improvements and modifications which become apparent to persons of ordinary skill in the art only after reading this disclosure, the drawings and the appended claims are deemed within the spirit and scope of the present invention.

What is claimed is:

1. A tool holder for holding a plurality of tools, wherein each tool includes an elongated rod having a bend through a predetermined angle and including a proximal end for engaging a workpiece and a mounting end between the bend and a distal end, the tool holder configured to be held adjacent to a tool handle, the tool holder comprising:

a. a body having a plurality of cavities, each cavity for accepting a correspondingly sized tool, wherein the tool holder apertures are positioned such that the proximal end of the accepted tools are parallel to the tool handle when the tool holder is coupled to the tool handle; and b. a holding member coupled to the body, wherein the holding member is configured to slide the tool holder at least partially along a length of the tool handle.

2. The tool holder held adjacent to the tool handle according to claim 1 herein the tool handle comprises two ends, each end positioned perpendicular to an outer surface face of the tool handle, the tool handle having a plurality of holding notches for holding a correspondingly sized tool, the holding notches each positioned within the tool handle, wherein the mounting end is positioned toward one of the ends and the proximal end is positioned to extend away from the outer surface face when engaged within the holding notch.

3. The tool holder held adjacent to the tool handle according to claim 2 wherein the tool handle further comprises a lock configured to secure the one or more tools to the corresponding holding notch, wherein the lock applies a securing force to the proximal end of the one or more tools.

4. The tool holder held adjacent to the tool handle according to claim 1 wherein the body includes a first side having a first dimension and a second side having a second dimension, the first side positioned proximal to the holding member and the second side positioned distal to the holding member, wherein the first dimension is larger in length than the second dimension.

5. The tool holder held adjacent to the tool handle according to claim 1 wherein the holding member is adapted to slide along the tool handle such that a frictional force between the holding member and the tool handle securely holds the tool holder in place along the tool handle.

6. A tool handle for accepting and holding one or more tools of differing sizes during use, wherein the one or more tools include an elongated rod having a bend through a predetermined angle and including a proximal end, and a mounting end between the bend and a distal end, comprising one or more of notches each integrally formed within the tool handle, each of the one or more notches for receiving and holding an appropriate one of the tools, wherein the mounting end of the appropriate one of the tools engages within a corresponding notch.

7. The tool handle according to claim 6 further comprising a lock configured to secure the one or more tools to the corresponding notch, wherein the lock applies a securing force to the proximal end of the one or more tools.

8. The tool handle according to claim 6 further comprising a tool holder, wherein the tool holder comprises:

a. a tool holding member configured to hold a group of one or more tools of multiple sizes securely upon insertion; and b. a tool handle holding member coupled to the tool holding member and configured to hold the tool handle adjacent to the tool holding member.

9. The tool handle according to claim 8 wherein the tool holding member includes a first side having a first dimension and a second side having a second dimension, the first side positioned proximal to the tool holding member and the second side positioned distal to the tool holding member, wherein the first dimension is larger in length than the second dimension.

10. The tool handle according to claim 6 wherein the tool handle includes a generally cylindrical outer surface, the outer surface including two ends opposite from one another.

11. A tool handle for accepting and holding any one of one or more tools of multiple sizes, each tool having a first segment and a second segment, wherein the second segment is longer than the first segment, the tool handle comprising a plurality of holding slots each integrally within the tool handle and each configured to be parallel along the tool handle, wherein second segment protrudes away from the holding slot through an aperture in the tool handle when the first segment is held within the holding slot, further wherein the handle is positioned substantially perpendicular to a workpiece when the second segment is engaged to the workpiece.

12. The tool handle according to claim 11 wherein the tool handle includes a generally cylindrical outer surface, the outer surface including two ends opposite from one another.

13. The tool handle according to claim 11 further comprising a lock configured to secure the one or more tools to the holding slot, wherein the lock applies a securing force to the second segment of the one or more tools.

14. The tool handle according to claim 11 further comprising a tool holder, wherein the tool holder comprises:

a. a tool holding member configured to hold the one or more tools of multiple sizes securely upon insertion; and b. a tool handle holding member coupled to the tool holding member, wherein the tool handle is configured to hold the tool handle adjacent to the tool holding member.

15. The tool handle according to claim 14 wherein the tool holding member includes a first side having a first dimension and a second side having a second dimension, the first side positioned proximal to the tool holding member and the second side positioned distal to the tool holding member, wherein the first dimension is larger in length than the second dimension.

16. A tool handle for accepting and holding one or more tools of differing sizes during use, wherein the one or more tools include an elongated rod having a bend through a predetermined angle and including a proximal end, and a mounting end between the bend and a distal end, comprising:

a. one or more of notches, each of the one or more notches for receiving and holding an appropriate one of the tools, wherein the mounting end of the appropriate one of the tools engages within a corresponding notch; and b. a lock for locking a tool in a notch during use.

17. The tool handle according to claim 16 wherein the lock is slidable and positionable.

18. The tool handle according to claim 16 wherein the lock is movable and positionable.

19. The tool handle according to claim 16 wherein the generally cylindrical outer surface includes two ends opposite from one another.

20. The tool handle according to claim 16 wherein the notch comprises:

a. one or more apertures each formed through a bottom of the notch and penetrating the tool handle; and b. one or more contoured compartments each configured for holding the mounting end of the tools of multiple sizes, each contoured compartment formed about a corresponding aperture, wherein a corresponding sized tool is engaged with the tool handle by passing the proximal end through an appropriately sized aperture until the mounting end rests in the contoured compartment corresponding to the appropriately sized aperture.

21. The tool handle according to claim 20 wherein each contoured compartment is configured to hold the mounting end of one or more tools within a defined range of sizes, and further wherein each corresponding aperture is configured to accept the proximal end of one or more tools within the defined range of sizes.

22. The tool handle according to claim 16 further comprising a tool holder, wherein the tool holder comprises:

a. a tool holding member configured to hold a group of one or more tools of multiple sizes securely upon insertion; and b. a tool handle holding member coupled to the tool holding member and configured to hold the tool handle adjacent to the tool holding member.

23. A tool handle for accepting and holding one or more tools of different sizes during use, the tool handle having a plurality of outer surface faces, the one or more tools including an elongated rod having a bend through a predetermined angle and including a proximal end and a mounting end between the bend and a distal end, the tool handle comprising:

a. one of more notches, the one or more notches for accepting the one or more tools, wherein the mounting end of the one or more tools is placed within the one or more notches; and b. a lock for securely holding the mounting end of the one or more tools within the one or more notches.

24. The tool handle according to claim 23 wherein the lock is slidable and positionable.

25. The tool handle according to claim 23 wherein the lock is movable and positionable.

26. The tool handle according to claim 23 wherein the generally cylindrical outer surface includes two ends opposite from one another.

27. The tool handle according to claim 23 further comprising a tool holder, wherein the tool holder further comprises:

a. a tool holding member configured to hold a group of one or more tools of multiple sizes securely upon insertion; and b. a tool handle holding member coupled to the tool holding member and configured to hold the tool handle adjacent to the tool holding member.

28. A tool handle for holding any one of one or more tools of multiple sizes, each of the one or more tools having a first segment and a second segment, the first segment being positioned at an angle with respect to the second segment, the tool handle comprising two ends, each end positioned perpendicular an outer surface face of the tool handle, the tool handle having a plurality of notches for holding a correspondingly sized tool, wherein the first segment is positioned toward one of the ends and the second segment is positioned to extend away from the outer surface face when engaged within the notch.

* * * * *

UNITED STATES PATENT AND TRADEMARK OFFICE

CERTIFICATE OF CORRECTION

PATENT NO. : 6,763,744 B2 
DATED : July 20, 2004
INVENTOR(S) : Kenneth R. Johnson et al.

It is certified that error appears in the above-identified patent and that said Letters Patent is hereby corrected as shown below:

Column 18,
Line 42, please add the following claims:

29. A tool handle for use with a plurality of tools of different sizes, each tool having a first segment, a second segment longer than the first segment, and a bend between the first segment and the second sgment, said tool handle comprising:

a generally cylindrical body having a first end and a second end opposite to each other and a plurality of slots formed on said generally cylindrical body, each slot having a size for holding the first segment of a respective tool between said first end and said second end with the second segment of the respective tool extending substantially perpendicular to said generally cylindrical body.

30. The tool handle of claim 64, further comprising an aperture between said first end and said second end of said generally cylindrical body, wherein the second segment of a tool extends through said aperture then the first segment of the tool is held on one of said plurality of slots.

31. A generally cylindrical tool handle for holding a selected one of a plurality of allen wrenches or of different sizes, the allen wrenches each having a linger section and a shorter section in generally perpendicular relation to each other, said tool handle having a longitudinal axis and first and second ends spaced apart by a distance which substantially exceeds the length of the shorter section of the largest size allen wrench, a plurality of slots formed within said tool handle between said first and second ends thereof, each of said slots having a size for removable holding the shorter of a selected allen wrench in a position between said first and second end substantially parallel with said longitudinal axis of the tool handle, at least one aperture formed within said tool handle between said first and second ends thereof, said aperture being located to permit the longer section of the selected allen wrench to extended threrethtough in a direction substaintially perpendicular to said longitudinal axis of said tool handle and intermediate said first and second ends thereof, whereby said tool handle may be manually gripped for rotating the longer section of the selected allen wrench.

32. A tool handle for use with a plurality of tools of different sizes, each tool having a first segment, a second segment longer than the first segment, and a bend between the first segment and the second segment, the tool handle comprising:

a. a body having a first end and a second end opposite of the first end; and
b. a plurality of slots on the body, each slot having a size for holding the first segment of a perspective tool extends through the aperture when the first segment of the tool is held in one of the plurality of slots.

UNITED STATES PATENT AND TRADEMARK OFFICE
CERTIFICATE OF CORRECTION

PATENT NO. : 6,763,744 B2
DATED : July 20, 2004
INVENTOR(S) : Kenneth R. Johnson et al.

It is certified that error appears in the above-identified patent and that said Letters Patent is hereby corrected as shown below:

Column 18 (cont'd),

33. The tool handle of claim 67 further comprising an aperture between the first end and the second end of the body, wherein the second segment of a respective tool extends through the aperture when the first segment of the tool is held in one of the plurality of slots.

34. The tool handle of claim 67 wherein the body has generally cylindrical shape.

35. The tool handle of clam 67 wherein the plurality of slots are formed on the body.

36. A tool handle for use with a plurality of tools of different sizes, each tool having a first segment, a second segment longer than the first segment, and a bend between the first segment and the second segment, the tool handle comprising:

a. a body having a first end and a second end opposite of the first end; and b. a plurality of notches on the body, each notch having a size for holding the first segment of a respective tool between the first end and the second end with the second segment of the respective tool extending substantially perpendicular to the body.

37. The body handle of claim 71 further comprising an apertyre between the first end and the second end of the body, wherein the seond segment of a respective tool extends through the aperture whenthe first segment of the tool is held in one of the plurality of nothces.

38. The tool handle of claim 71 wherein the body has a generally cylindrical shape.

39. The tool handle of claim 71 wherein the plurality of notches are formed on the body.

Signed and Sealed this

Fifth Day of October, 2004

JON W. DUDAS

*Director of the United States Patent and Trademark Office*